(12) United States Patent
Levine et al.

(10) Patent No.: US 7,883,802 B2
(45) Date of Patent: Feb. 8, 2011

(54) SYSTEMS AND METHODS FOR ELECTROCHEMICAL POWER GENERATION

(75) Inventors: R. Paul Levine, Palo Alto, CA (US); Robert Danziger, 189 Upper Walden Rd., Carmel, CA (US) 93923

(73) Assignee: Robert Danziger, Carmel, CA (US)

( * ) Notice: Subject to any disclaimer, the term of this patent is extended or adjusted under 35 U.S.C. 154(b) by 0 days.

(21) Appl. No.: 12/333,049

(22) Filed: Dec. 11, 2008

(65) Prior Publication Data
US 2009/0311559 A1    Dec. 17, 2009

Related U.S. Application Data

(60) Provisional application No. 61/061,945, filed on Jun. 16, 2008, provisional application No. 61/090,160, filed on Aug. 19, 2008.

(51) Int. Cl.
*H01M 8/16* (2006.01)
*H01M 8/08* (2006.01)

(52) U.S. Cl. .................. 429/401; 429/422; 429/500
(58) Field of Classification Search .................. None
See application file for complete search history.

(56) References Cited

U.S. PATENT DOCUMENTS 4,622,275 A    11/1986 Noguchi et al.
6,190,428 B1    2/2001 Rolison et al.
6,929,858 B2 *    8/2005 Zguris et al. ............... 428/392
2005/0255345 A1 *    11/2005 Gerritse et al. ............ 429/13
2007/0212584 A1    9/2007 Chuang

FOREIGN PATENT DOCUMENTS

WO    2006121981 A2    11/2006

OTHER PUBLICATIONS

Bajpai et al., "Nature and composition of pyrite framboids and organic substrate from degraded leaf cuticles of late Tertiary sediments, Mahuadanr Valley, Palamu, Bihar", Current Science, (2001), 81(1):102-106.
Cheng et al., "Electricity Generation from Synthetic Acid-Mine Drainage (AMD) Water using Fuel Cell Technologies", Environ. Sci. Technol., (2007), 41:8149-8153.

* cited by examiner

*Primary Examiner*—John S Maples
(74) *Attorney, Agent, or Firm*—Rudy J. Ng; Bozicevic, Field & Francis LLP

(57) ABSTRACT

Electrochemical power generation systems in which the oxidizable reactant is non-carbon constituents of a fossil fuel are provided. The fossil fuel may be coal, which is contacted with an aqueous electrolyte medium used in the systems. The electrolyte may, in certain aspects, be acid mine drainage. Aspects of the invention include systems and methods for remediation of acid mine drainage, where the systems are configured to raise the pH of acid mine drainage. Aspects of the invention also include regenerating the electrolyte using an external electricity source and recirculating the electrolyte to the system.

25 Claims, 8 Drawing Sheets

SYSTEMS AND METHODS FOR ELECTROCHEMICAL POWER GENERATION

CROSS-REFERENCE TO RELATED APPLICATIONS

Pursuant to 35 U.S.C. §119 (e), this application claims priority to the filing date of U.S. Provisional Application Ser. No. 61/061,945 filed Jun. 16, 2008 and U.S. Provisional Application Ser. No. 61/090,160 filed Aug. 19, 2008; the disclosures of which applications are herein incorporated by reference.

INTRODUCTION

Coal is our most abundant fossil fuel; however, there are a number of adverse environmental effects of coal mining and burning. Burning coal causes the release of carbon dioxide, which is a greenhouse gas that contributes to climate change and global warming. In addition, the release of carbon dioxide into the atmosphere contributes to ocean acidification, which is the ongoing decrease in the pH of the Earth's oceans, caused by their uptake of anthropogenic carbon dioxide (i.e., carbon dioxide derived from human activities) from the atmosphere.

In addition to hydrocarbons, coal contains significant amounts of organic and inorganic constituents, such as sulfur and iron. These impurities are generally viewed as undesirable contaminants that need to be scrubbed from the desired hydrocarbons. For example, in conventional processes, coal may be crushed and washed in a coal preparation plant, where pyrite is collected and disposed of prior to combustion of the remaining coal. Alternatively, scrubbers may use limestone to combine with flue gases and entrap the sulfur. These methods are designed to remove what are perceived to be undesirable contaminants.

Acid mine drainage (AMD) is made when metal sulfides, principally pyrite, are oxidized and acidify contacting water to undesirable levels. Water sources include rainwater, streams, rivers, groundwater, groundwater in mines, groundwater in abandoned mines, etc. Even in moderate concentrations, AMD is toxic to fish and aquatic insects that fish eat. AMD is characterized by high acidity, high metal concentrations such as iron, high sulfate levels, and excessive suspended solids, which result in siltation that smothers fish and aquatic insects. Small amounts of AMD can harm the life in streams because the metals, sulfates and/or other suspended solids settle out of the water and coat the rocks and gravel on the stream bottom. When this happens, the insects that live on and under the rocks are smothered because they cannot get oxygen out of the water. And if the aquatic insects die, the fish have little or no food. When coal is washed with water as described above it creates AMD. At locations that are required to control their AMD, such as coal mines, coal-fired power plants, and the like, the AMD is remediated by mixing in limestone, which raises the pH, but also releases carbon dioxide.

One method of obtaining energy from coal is by gasification to break down coal into its basic chemical constituents. In a typical gasifier, coal is exposed to hot steam and carefully controlled amounts of air or oxygen under high temperatures and pressures. The coal gases are cleaned of their impurities and become what is generally known as "syngas". The syngas can be made into natural gas, ethanol, petroleum substitutes and other fuels that can be used for any purpose those fuels are used for. For instance, syngas may be fired in a gas turbine to generate electricity. The hot exhaust of the gas turbine is then used to generate steam for a more conventional steam turbine-generator. This dual source of electric power, called a "combined cycle", converts much more of the inherent energy contained in coal into useable electricity. Other concepts include the use of a fuel cell or fuel cell-gas turbine hybrid.

Fuel cells make use of an electrochemical reaction involving a fuel and an oxidant in a cell that comprises an anode, cathode and electrolyte, to generate electricity without also generating the unwanted by-products associated with combustion, while providing relatively higher energy efficiency. Thus, fuel cells potentially have a number of advantages over other power generation or storage means in many applications. In the operation of a fuel cell configured to produce electricity, an oxidizable substrate is used to generate electrons that are transferred to the anode; the electrons are passed through a device used to capture the energy gain and reacted at the cathode with a suitable oxidant, typically molecular oxygen (which, upon combining with protons, results in formation of water). In the operation of a fuel cell configured to produce hydrogen, an oxidizable substrate (electron donor) is provided to generate electrons. A power source is connected to the fuel cell and a voltage is applied, generating electrons that are transferred to the anode, and, through a conductive connector, to the cathode where protons ($H^+$) are reduced to form molecular hydrogen ($H_2$).

Many configurations of fuel cells have been described in the art, (e.g. as set forth in any one of U.S. Pat. Nos. 6,911,057; 6,866,957; 6,692,861; 6,669,917; 6,653,005; 6,548,197; 6,475,653; 6,183,896; 6,017,646; 5,554,453; 5,409,784; 5,376,469; 5,198,310; 5,084,362; 4,956,131; 4,921,765; 4,891,279; 4,855,092; 4,686,072; 4,666,755; 4,622,275; 4,611,396; and 4,041,210, herein specifically incorporated by reference). Typically fuel cells powered by coal are run at high temperatures, for example at 400° C. to 2000° C., in order to fully oxidize the carbon present in coal.

Batteries convert chemical energy into electrical energy. Rechargeable batteries receive and store electricity and then later produce electricity by converting chemical energy into electrical energy. Batteries include an anode, a cathode, and an electrolyte, and make use of an electrochemical reaction to generate electricity. Batteries can generate electricity electrochemically without also generating the unwanted byproducts associated with combustion, while providing relatively higher energy efficiency.

SUMMARY

Systems, compositions and methods are provided for electrochemical power generation, wherein the non-carbon constituents of a fossil fuel are oxidized to obtain energy at a temperature below the oxidation temperature of carbon. Additional aspects include systems and methods for remediating acid mine drainage (AMD), where, in some instances, the systems are configured to raise the pH of AMD. In certain embodiments, the non-carbon constituents of the fossil fuel are regenerated using electricity (either chemically or biologically). In certain embodiments, the non-carbon constituent of the fossil fuel oxidized by the electrochemical power generation system is a metal-sulfide. Thus, in some cases, the electrochemical power generation system is a metal-sulfide electrochemical power generation system. In some cases, the non-carbon constituents of fossil fuels are pyritic sulfur and iron constituents. In certain embodiments, the fossil fuel is coal. In these cases, the coal may be contacted with an aqueous electrolyte medium. In some embodiments, the coal is crushed into particulates prior to contacting with the aqueous electrolyte medium. The systems may include the particulate coal suspension thus produced, or may include the reactant mixture in the absence of particulates. In certain embodiments, the non-carbon constituents of the fossil fuel can be regenerated in a regeneration reactor and recirculated to the system. Under low temperature conditions, the carbon present in the fossil fuel is not oxidized and is available for additional energy extraction. In some embodiments, the fossil fuel is then further utilized in conventional processes or for other energy extraction. In other embodiments, the fossil fuel is not used in a secondary process of conventional combustion, thus electricity is produced without generating $CO_2$.

These and other features, aspects, and advantages of the present invention will become better understood upon consideration of the following detailed description, drawings, and appended claims.

DETAILED DESCRIPTION

Figure 1:
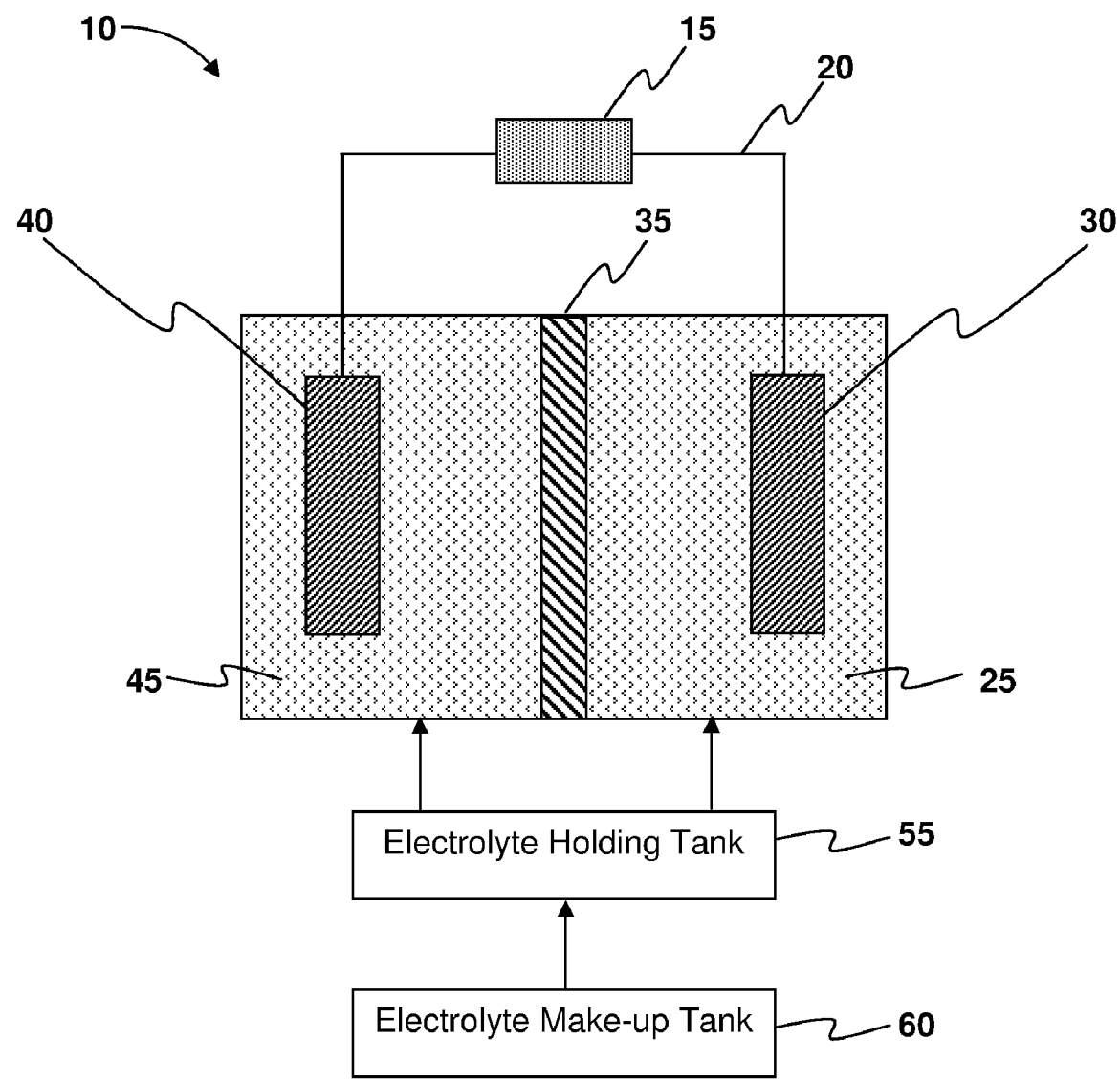
FIG. 1 shows a schematic drawing of an electrochemical power generation system as described herein.

Electrochemical power generation systems, wherein the non-carbon constituents of fossil fuels are oxidized to obtain energy, are provided. In certain embodiments, the non-carbon constituent of the fossil fuel oxidized by the electrochemical power generation system is a metal-sulfide, such as but not limited to pyrite. Thus, in some cases, the electrochemical power generation system is a metal-sulfide electrochemical power generation system. The fossil fuel may be coal, which is contacted with an aqueous electrolyte medium used in the systems. The electrolyte may, in certain aspects, be acid mine drainage. Aspects of the invention include systems and methods for remediation of acid mine drainage, where the systems are configured to raise the pH of acid mine drainage. Aspects of the invention also include regenerating the electrolyte using an external electricity source and re-circulating the electrolyte to the system. Under low temperature conditions, the carbon present in the fossil fuel is not oxidized and is available for additional energy extraction. In some embodiments, the fossil fuel is then further utilized in conventional processes or for other energy extraction. In other embodiments, the fossil fuel is not used in a secondary process of conventional combustion, thus electricity is produced without generating $CO_2$.

Before the present invention is described in greater detail, it is to be understood that this invention is not limited to the particular embodiments described, and as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

In further describing the subject invention, representative embodiments of systems and compositions of the subject invention are described first in greater detail, followed by a review of the subject methods in which the subject systems and compositions find use.

Systems and Compositions

An electrochemical power generation system is provided according to embodiments of the present invention that includes: an anode; a cathode; an electrical conductor connecting the anode and the cathode; and a housing for containing an aqueous electrolyte medium in contact with at least a portion of the anode and the cathode, wherein the aqueous electrolyte medium comprises non-carbon constituents of a fossil fuel, and wherein the system is configured to obtain energy from non-carbon constituents of the fossil fuel at a temperature below the oxidation temperature of carbon. In some cases, the system further comprises the aqueous electrolyte medium in the housing. In some instance, the electrical conductor comprises an electrical load. In certain embodiments, the system further includes a reactor configured to regenerate the non-carbon constituents of the fossil fuel, wherein the reactor contains a regeneration medium charged by external energy. In some cases, the reactor is configured to regenerate the non-carbon constituents of the fossil fuel, such as pyrite, chemically. In these cases, the regeneration medium may be contacted with a source of energy, such as but not limited to, electrical energy (i.e., electricity), coal, acid mine drainage, solar energy, and the like, to regenerate pyrite. In some cases, the regeneration medium includes at least one species of microorganism for regenerating the non-carbon constituents of the fossil fuel, such as pyrite. In these cases, the at least one species of microorganism for regenerating pyrite can be a sulfate reducing bacteria, a sulfur reducing bacteria, an iron reducing bacteria, or combinations thereof. In some embodiments, a hydrogen producing fuel cell is provided, which includes a power supply for the application of voltage. In some embodiments, the power supply for a hydrogen producing fuel cell is an electricity producing system of the invention.

In certain embodiments, as described above, the non-carbon constituents oxidized in the subject systems are obtained from fossil fuels. In some cases, the fossil fuel is coal. In other cases, the fossil fuel comprises coal, tar sands, oil shale, heavy oil, crude oil, or mixtures thereof. For example, the fossil fuel may comprise a mixture of coal and tar sands, coal and oil shale, coal and heavy oil, coal and crude oil, or other combinations thereof.

In certain embodiments, the fossil fuel is coal. In these cases, the coal may be contacted with an aqueous electrolyte medium. In some embodiments, the coal is crushed into particulates prior to contacting with the aqueous electrolyte medium. In some instances, the coal is crushed and washed or soaked in an electrolyte, e.g. aqueous, medium to provide an aqueous electrolyte medium comprising oxidizable non-carbon reactants. In some cases, the systems may include the particulate coal suspension thus produced, or may include the reactant mixture in the absence of particulates. For example, in conventional coal processes, the coal may be crushed and washed in a coal preparation plant, where pyrite is collected and disposed of prior to combustion of the remaining coal. In certain embodiments, the aqueous medium used for this purpose (i.e., for soaking and/or washing coal) can be used in the subject methods. In some cases, the aqueous medium may be, but is not limited to water, seawater, acid mine drainage, combinations thereof, and the like.

In certain embodiments, the electrochemical power generation system is a metal-sulfide electrochemical power generation system. Thus, in some cases, the non-carbon constituent of the fossil fuel oxidized by the electrochemical power generation system is a metal-sulfide, such as but not limited to pyrite. In some cases, the non-carbon constituents of the fossil fuel include, but are not limited to the following: pyrite and pyrite group minerals (including framboidal morphologies), magnetite, greigite; ferrous iron-containing compounds; sulfur-containing compounds; or combinations thereof. Framboidal structures comprise roughly spherical aggregates of discrete equi-regular euhedral microcrystallites 0.1 µm to 1 µm in diameter, such as 0.5 µm in diameter, with the average aggregate size ranging from 1 µm to 50 µm, such as from 1 µm to 25 µm, including from 5 µm to 20 µm. In some cases, framboid diameter correlates positively with microcrystal size. In some instances, microcrystal packing is irregular and disordered.

In some cases, the aqueous electrolyte medium includes a source of oxygen. In some cases, the aqueous electrolyte medium includes a source of carbon. In these cases, the source of carbon can be, but is not limited to $CO_2$, $CO_2$-laden flue gas, or combinations thereof. In certain embodiments, the aqueous electrolyte medium includes, but is not limited to seawater, acid mine drainage, or combinations thereof. In certain embodiments, the aqueous electrolyte medium including non-carbon constituents of the fossil fuel is obtained by contacting an aqueous medium with the fossil fuel. In certain embodiments, the aqueous medium is acid mine drainage.

In certain embodiments, the anode and the cathode individually comprise zinc, reticulated vitreous zinc, crimped zinc, ridged zinc, lead, magnesium, coal, metal-sulfides, pyrite, iron pyrite, sulfur, petroleum coke, copper, nickel, silicon nanowires, carbon fiber, brush electrodes, lithium compounds, tubular cathode on hydrophobic side, graphite rods, graphite disks, graphite plates, graphite granules, graphite felt, stainless steel rods, carbon cloth, carbon paper, Toray carbon paper, carbon granules, carbon foam, carbon beads, reticulated vitreous carbon, reticulated vitreous carbon foam, gold, gold-plated substrates, platinum, platinized substrates, cobalt tetramethylphenylporphyrin, plated steel, platinum-plated aluminum, gold-plated aluminum, or combinations thereof. In some cases, the anode and/or the cathode can be an electrode stack. In these cases, the electrode stack can include one or more anode layers and one or more cathode layers, where the one or more anode layers and one or more cathode layers are configured in alternating layers. In certain embodiments, the cathode is an air cathode.

In some embodiments, the electrochemical power generation system includes one or more flat-plate electrodes. In these embodiments, the electrodes are solid, substantially planar electrodes. In some cases, the electrochemical power generation system includes one or more flow-through electrodes, where the flow-through electrodes are configured such that the electrolyte flows through the electrodes, as well as around the electrodes, in some instances. In certain embodiments, the flow-through electrodes are comprised of a porous substrate, such as, but not limited to reticulated vitreous carbon foam, and the like.

In certain embodiments, the energy produced by the electrochemical power generation system is electrical energy. In some embodiments, the electrochemical power generation system is configured to produce hydrogen ($H_2$). In some cases, the system operates at a temperature below the oxidation temperature of carbon, such as but not limited to ambient temperature or low or medium temperature steam conditions.

In certain embodiments, the anode and the cathode are not separated by a permeable barrier. In other embodiments, the system includes a permeable barrier that separates the anode and the cathode. In these embodiments, the permeable barrier can be an ion or proton exchange membrane.

Other aspects of certain embodiments of the electrochemical power generation systems of the invention include that the system is an open vessel. In some cases, the system is a continuous flow fuel cell or battery. In other cases, the system is a batch processor.

Additional aspects of the present invention include a method for obtaining energy from non-carbon constituents of a fossil fuel. The method includes the steps of contacting the fossil fuel with an aqueous medium to produce an aqueous electrolyte medium (i.e., a reactant mixture) comprising oxidizable non-carbon constituents of the fossil fuel, and oxidizing the reactant mixture in an electrochemical power generation system to obtain energy at a temperature below the oxidation temperature of carbon. In certain embodiments, the aqueous medium includes acid mine drainage.

In certain embodiments, the aqueous electricity-producing portions are processed in order to produce a reactant mixture that has a standardized energy density. As used herein, the terms "standard" and "standardized" are interchangeable and refer to values that are within a pre-determined range. For example, in certain embodiments, the standardized energy density ranges from 6,000 btu per gallon to 200,000 btu per gallon, such as from 6,000 btu per gallon to 135,000 btu per gallon, including from 6,000 btu per gallon to 70,000 btu per gallon. In addition, in some cases, the aqueous electricity-producing portions may be processed to increase the energy density of the reactant mixture. Thus, in certain embodiments, the methods of the present invention further include processing the aqueous electrolyte medium to produce an aqueous electrolyte medium with a standardized energy density. In certain cases, the processing comprises concentrating the aqueous electrolyte medium. The concentrating may be performed by any convenient method, such as but not limited to inertial separation, gravity stratification, stratification induced by chemical additives, stratification induced by thermal additives, evaporation, settling, centrifugation, and the like. In some cases, the processing step is performed before oxidizing the reactant mixture in the electrochemical power generation system. In some cases, the concentrating step is performed as part of the regeneration step, as described in more detail below. In other cases, the concentrating step may be performed both prior to oxidation of the reactant mixture and during the regeneration step. Thus, in some instances, the electrochemical power generation system of the present invention further includes an aqueous electrolyte medium processor, where the aqueous electrolyte medium processor is configured to produce an aqueous electrolyte medium with a standardized energy density. In certain cases, the aqueous electrolyte medium comprises acid mine drainage.

In certain embodiments, the method further includes the step of regenerating the non-carbon constituents of the fossil fuel. In some cases, the regenerating step includes removing a portion of the reactant mixture and contacting the removed portion of the reactant mixture with a source of energy, such as but not limited to, electrical energy (i.e., electricity), coal, acid mine drainage, solar energy, and the like, to regenerate pyrite and produce a regenerated reactant mixture. In these cases, the method can further include the step of contacting the regenerated reactant mixture with the reactant mixture. In certain embodiments, the regenerating step includes removing a portion of the reactant mixture and contacting the removed portion of the reactant mixture with at least one species of microorganism to regenerate the non-carbon constituents of the fossil fuel, such as pyrite, and produce a regenerated reactant mixture. In these embodiments, the at least one species of microorganism includes, but is not limited to a sulfate reducing bacteria, an iron reducing bacteria, or combinations thereof. In some cases, the method further includes the step of contacting the regenerated reactant mixture with the reactant mixture.

An additional aspect of embodiments of the present invention is that the methods and systems are configured to reduce the amount of non-carbon constituents of the fossil fuel. In certain instances, as described above, the fossil fuel is coal. In some cases, the methods and systems reduce the amount of iron and sulfur compounds in the coal. Thus, in some cases, the subject methods and systems provide a source of coal that includes less iron and sulfur compounds than the coal that was input into the system. In certain embodiments, the method further includes the step of separating the fossil fuel from the reactant mixture prior to the regenerating step. In these embodiments, the separating and concentrating may be performed by any convenient method known to those of skill in the art, such as, but not limited to filtering, sedimentation, and the like.

In certain embodiments, the method further includes testing the reactant mixture. In these embodiments, the testing can include, but is not limited to detecting one or more of the following: energy content, energy density, pH, pyrite concentration, sulfur concentration, iron concentration, carbon concentration, oxygen concentration, the other constituents that are found in AMD and their concentration (for example, commercially-recoverable metals), and electrolyte concentration.

In certain embodiments, the method further includes concentrating the regenerated reaction mixture. The concentrating may be performed by any convenient method, such as but not limited to inertial separation, gravity stratification, stratification induced by chemical additives, stratification induced by thermal additives, evaporation, settling, centrifugation, and the like. In certain embodiments, the regenerated reaction mixture is stored under non-reactive atmospheric conditions, such as but not limited to storing the regenerated reaction mixture under a nitrogen atmosphere, an argon atmosphere, and the like.

Additional aspects of the present invention include a system for generating power that includes one or more electrochemical power generation systems as described above. In particular, the one or more electrochemical power generation systems can include an anode, a cathode, an electrical conductor connecting the anode and the cathode, and a housing for containing an aqueous electrolyte medium in contact with at least a portion of the anode and the cathode, where the aqueous electrolyte medium comprises non-carbon constituents of a fossil fuel, and where the one or more electrochemical power generation systems are configured to obtain energy from non-carbon constituents of the fossil fuel at a temperature below the oxidation temperature of carbon. In some cases, the system further comprises the aqueous electrolyte medium in the housing. In some instances, the electrical conductor comprises an electrical load. In certain embodiments, the system further includes one or more reactors configured to regenerate the non-carbon constituents of the fossil fuel, where the reactors contain a regeneration medium contacted with a source of energy. In certain embodiments, the system further includes one or more aqueous electrolyte medium processors, wherein the aqueous electrolyte medium processors are configured to produce the aqueous electrolyte medium with a standardized energy density, as described herein.

Additional aspects of the present invention include a flow battery. As used herein, the terms "flow battery" and "flow fuel cell" are interchangeable and refer to electrochemical systems that include elements of both a fuel cell and a battery. In a flow battery, an electrolyte has an energy potential that is collected by the anode and cathode, and, in some cases, is recharged by continuously flowing more electrolyte to the battery. For example, in certain cases, the present invention is a flow battery, where the battery is configured to be continuously recharged by adding more electrolyte. In certain embodiments, the electrolyte is acid mine drainage (AMD). In some instances, the electrolyte can be regenerated by an external input of energy to produce the chemical constituents that make up the electrolyte. In certain embodiments, the electrolyte (such as, in some cases, AMD) is stable over long periods of time. In these embodiments, the recharge/regeneration process can allow energy storage over one or more days, such as one or more weeks, including one or more months, for example one or more years. Thus, in some cases, the devices and systems of the present invention are configured to store energy when it is readily available and then release the energy as desirable at a later time. For instance, in certain embodiments, the subject systems and devices find use in storing energy from the production of electricity from coal, as well as from intermittent energy sources, such as, but not limited to windmills and solar energy systems.

As discussed above, an aspect of the presently disclosed electrochemical power generation system is that the non-carbon constituents of the fossil fuel can be regenerated in a regeneration reactor and re-circulated to the system. In these embodiments, a portion of the aqueous electrolyte medium (i.e., the reactant mixture) in the system may be removed. The removed portion of the aqueous electrolyte medium may then be tested. In some cases, the testing comprises detecting one or more of the following: energy content, energy density, pH, pyrite concentration, sulfur concentration, iron concentration, carbon concentration, oxygen concentration, electrolyte concentration, and the like. In some cases, if the testing indicates that the aqueous electrolyte medium is suitable for regeneration of the non-carbon constituents of coal, then the aqueous electrolyte medium may be transferred to a regeneration reactor for regeneration of the non-carbon constituents of the fossil fuel. For instance, the fossil fuel may be coal and the non-carbon constituent of the fossil fuel may be pyrite, thus the regeneration reactor may be configured to regenerate pyrite. In other embodiments, if the testing indicates that the aqueous electrolyte medium is not suitable for regeneration of the non-carbon constituents of the fossil fuel (i.e., the electrolyte is "spent"), then the aqueous electrolyte medium may be removed from the system and transferred for waste treatment and safe disposal. In these embodiments, the pH of the spent aqueous electrolyte medium can be raised to a pH range from 5 to 10, such as from 6 to 9, including from 6 to 8. For example, the pH of the spent aqueous electrolyte medium can be raised by buffering the spent aqueous electrolyte medium with fly ash from a coal-fired power plant. Fly ash has a pH of about 12. In other cases, the pH of the spent aqueous electrolyte medium is raised by buffering the spent aqueous electrolyte medium with limestone, calcium carbonate ($CaCO_3$, including calcite, aragonite, and the like), combinations thereof, and the like.

In certain embodiments, the regeneration reactor is configured to regenerate pyrite (or other iron sulfide phase) chemically. In these embodiments, the regeneration reactor includes a regeneration medium, where the regeneration medium includes the removed portion of the aqueous electrolyte medium, as described above. In cases where pyrite is regenerated chemically, the regeneration medium may be contacted with a source of energy to regenerate pyrite. The source of energy may include, but is not limited to electrical energy from the grid (i.e., energy provided by a public electricity network) or distributed energy resources (e.g., solar energy sources, wind energy sources, distributed cogeneration sources, such as natural gas-fired microturbines or reciprocating engines, combined cycle generation, fuel cells, Stirling engines, and the like), coal, acid mine drainage, and the like. In certain embodiments, the source of energy is contacted with the regeneration medium and is used to regenerate pyrite by facilitating the chemical reduction of iron and/or sulfur in the regeneration medium. The reduced sulfur (as sulfide) may then, in some cases, react with ferrous ions in the regeneration medium to produce iron pyrite and a pyrite-laden regenerated reactant mixture.

In certain embodiments, the regeneration medium can include a fossil fuel, where the fossil fuel can be used to facilitate the reduction of ferric iron to ferrous iron and sulfate (or other oxidized sulfur forms) to sulfide to produce pyritic solids regenerated reactant mixture. In some cases, the fossil fuel is coal, such that the regeneration medium includes coal. In certain embodiments, the regeneration medium includes acid mine drainage. Acid mine drainage or acid rock drainage. The terms "acid mine drainage" and "acid rock drainage" are used interchangeably herein and refer to the outflow of acidic water from abandoned metal or coal mines. However, other areas where the earth has been disturbed (e.g. construction sites, subdivisions, transportation corridors, etc.) may also contribute acid rock drainage to the environment.

In some cases, the aqueous electrolyte medium used in the system comprises acid mine drainage. In some instances, the pH of acid mine drainage may be 5 or less, such as 3 or less, including 1 or less. In certain embodiments, the subject systems are configured to facilitate the remediation of acid mine drainage. As used herein, the term "remediation" and "remediate" are used interchangeably and refer to the reduction of pollution or contaminants from environmental media such as soil, groundwater, sediment, or surface water to minimize ecological risks and adverse effects on human health. In some cases, the subject systems may facilitate an increase in the pH of acid mine drainage streams to a pH of 1 or more, such as 3 or more, including 5 or more. Subsequently, the pH of the spent aqueous electrolyte medium can be raised to a pH range from 6 to 9, such as 6 to 8, as described above.

In certain embodiments, the electrochemical power generation system further comprises an electrolyte make-up tank. In some cases, after pyrite regeneration in the regeneration reactor, the regenerated reactant mixture may be transferred to the electrolyte make-up tank. In some instances, the regenerated reactant mixture is contacted with an aqueous electrolyte medium. In some cases, the aqueous electrolyte medium may be the aqueous electrolyte medium obtained from contacting crushed and/or un-crushed coal with an aqueous medium, as described above. The combined aqueous electrolyte medium may then be used in the system, or optionally stored in a holding tank or pit before being used in the system. In certain cases, the holding tank is configured to store the combined aqueous electrolyte medium under low-oxygen conditions. In some embodiments, the holding tank is purged with an inert (i.e., non-reactive) gas, such as but not limited to nitrogen, argon, and the like.

In other embodiments, the regeneration reactor is configured to regenerate pyrite biologically. In these embodiments, a portion of the reactant mixture in the system may be removed and transferred to the regeneration reactor. In cases where pyrite is regenerated biologically, the aqueous medium in the regeneration reactor (i.e., the regeneration medium) includes at least one species of microorganism for regenerating the non-carbon constituents of the fossil fuel, such as pyrite. In these embodiments, the at least one species of microorganism for regenerating pyrite may include, but is not limited to an iron reducing bacteria, a sulfur (e.g. sulfate) reducing bacteria, and the like. The sulfur reducing bacteria carry out the reduction of sulfur, which may then, in some cases, react with ferrous ions in the regeneration medium or within the cells to produce a pyritic regenerated reactant mixture. In some cases, the microorganisms can consume hydrogen to carry out reactions to produce pyrite. In certain embodiments, the at least one species of microorganism for regenerating pyrite includes a microorganism that reduces ferric iron to ferrous iron, which may then, in some cases, react with sulfide ions in the regeneration medium within the cells to produce iron pyrite and a pyrite-laden regenerated reactant mixture. In some cases, the microorganisms can consume $CO_2$ to carry out the reactions to produce pyrite.

In some cases, the regeneration reactor includes a hybrid regeneration system, where the hybrid regeneration system is configured such that heat from the sun evaporates and concentrates the mixture, photochemical and photosynthetic reactions occur near the surface of the mixture, and chemical and/or biological processes that do not depend on light occur below the surface of the mixture. In some cases, the chemical and/or biological processes include, but are not limited to using biomass, coal, acid mine drainage, or other energy source, for promoting regeneration of non-carbon constituents of fossil fuels in the absence of light.

In certain embodiments, the regeneration medium may be stored in the regeneration reactor for a length of time sufficient to regenerate pyrite. In some cases, the regeneration reactor is of a size such that the amount of pyrite regenerated by the regeneration reactor is sufficient to provide enough pyrite to fulfill the electrochemical power generation system's pyrite consumption requirements. Thus, in these cases, the system can be operated independent from the input of external electricity to regenerate pyrite.

Subsequently, in certain cases, the regenerated reactant mixture may be transferred to the electrolyte make-up tank and contacted with the aqueous electrolyte medium, as described above. The combined aqueous electrolyte medium may then be used in the electrochemical power generation system, or optionally stored in a holding tank or pit before being used for electrochemical power generation. In certain embodiments, the pyritic solids in the regeneration medium are separated or concentrated from the regeneration medium before being transferred to the electrolyte make-up tank. The pyritic solids may be separated by any convenient means, such as but not limited to filtering the regeneration medium, allowing the pyritic solids to settle out of the regeneration medium, or the like. In some embodiments, the pyritic solids can be collected from the regeneration medium as a slurry, such that the concentration of pyrite in the slurry is greater than the concentration of pyritic solids in the regeneration medium. In some embodiments, the pyritic-deficient regeneration medium (i.e., the resulting filtrate, supernatant, or mother liquor) can be removed from the regeneration reactor and recycled or sent to a water reclamation plant.

In certain embodiments, the electrochemical power generation systems generate electricity at temperatures below 400° C. Alternatively, the systems can produce hydrogen at temperatures below 400° C. Under such conditions the carbon present in the fossil fuel is not oxidized, and is available for additional energy extraction. In some embodiments, the fossil fuel is then further utilized in conventional processes, such as in a fuel cell, or for other energy extraction. For example, in some cases, the residual coal from the systems is used to produce electricity and/or hydrogen. In some cases, the iron and/or sulfur form a precipitate, which may be removed prior to energy extraction from the carbon present in the fossil fuel. In some cases, systems of the present invention are configured to generate electricity, and also configured to produce hydrogen during acid mine drainage remediation.

In certain cases, the systems may be operated under low and medium temperature steam conditions, for example at a temperature less than 400° C., such as less than 300° C., including less than 200° C., including less than 150° C., for instance 100° C. In these cases, the pressure in the system may range from 0.5 atm to 5 atm, such as from 0.5 atm to 3 atm, including from 0.5 atm to 2 atm. In some cases, the system may be operated at ambient temperature, e.g. from 0° C. to 37° C., such as 25° C. to 30° C., and at a pressure ranging from 0.5 atm to 5 atm, such as 0.5 atm to 3 atm, including from 0.5 atm to 2 atm. In addition, in embodiments that include microorganisms in the regeneration reactor for regenerating pyrite, the temperature of the regeneration medium is a temperature that is compatible with the operating temperature of the microorganisms. Thus, in some cases, the temperature of the regeneration medium may facilitate the efficient reduction of ferric iron to ferrous iron by the microorganisms.

The amount of electricity generated (in watts) depends on the surface area of the electrodes, the composition of the electrodes, the spacing of the anode and cathode, and a variety of other factors readily apparent to those of skill in the art. In some embodiments, the electrochemical power generation system produces outputs ranging from at least 0.1 mW, such as at least 200 mW, and including at least 500 mW, for example at least 1 W, such as at least 100 W, and including at least 1000 W. In some embodiments, the system produces outputs ranging from at least 1 Megawatt, such as at least 100 Megawatts, and including at least 200 Megawatts. Those of skill in the art will appreciate that the output can vary with resistance. In a batch reaction, useful electricity may be generated for at least 1 day, at least 2 days, at least 3 days or longer. Alternatively a continuous flow process may be used. In certain cases, a continuous flow process may be used, where the electrodes are porous. In certain cases, the porous electrodes may include, but are not limited to reticulated vitreous carbon, reticulated vitreous carbon foam, crimped substrates, combinations thereof, and the like.

In certain embodiments, the non-carbon constituent of coal used in the electrochemical power generation systems is pyrite. In some cases, the non-carbon constituents of coal are pyrite, pyrite group minerals, other iron-containing compounds, sulfur-containing compounds, or combinations thereof. Pyrite group minerals include, but are not limited to pyrite ($FeS_2$), marcasite ($FeS_2$, a polymorph of pyrite), greigite ($Fe_3S_4$), pyrrhotite (FeS), sphalerite (ZnS), stibnite ($Sb_2S_3$), galena (PbS), arsenopyrite (AsFeS), chalcopyrite ($FeCuS_2$), molybdenite ($MOS_2$), aurostibite ($AuSb_2$), dzharkenite ($FeSe_2$), cattierite ($COS_2$), erlichmanite ($OsS_2$), fukuchilite ($Cu_3FeS_8$), pentlandite (nickel iron sulfide), cinnabar (mercury sulfide), gaotaiite ($Ir_3Te_8$), geversite ($PtSb_2$), insizwaite ($Pt(Bi,Sb)_2$), krutaite ($CuSe_2$), krutovite ($NiAs_2$), laurite ($RuS_2$), mayingite (IrBiTe), penroseite ($(Ni,Co,Cu)Se_2$), sperrylite ($PtAs_2$), trogtalite ($CoSe_2$), vaesite ($NiS_2$), and villamaninite ($(Cu,Ni,Co,Fe)S_2$). In certain embodiments, the sulfur-containing compounds may include reduced organic sulfur, elemental sulfur, $S_2O_3$, $SO_2$, $SO_3$, $SO_4$, and the like that may also be products of coal or fossil fuel combustion. Iron(II)-containing compounds include, but are not limited to, $FeCO_3$, $Fe_3O_4$, and the like.

In some instances, coal used in the subject systems comprises at least 1% pyrite, such as at least 2% pyrite, for example at least 3% pyrite, including at least 4% pyrite, or more. Where desired, the sulfur and iron content may be determined using methods known in the art, e.g. total sulfur, monosulfide, and sulfate sulfur may be determined by infrared absorption of the $SO_2$ produced by combustion of whole coal or of the separated forms of sulfur in an oxygen atmosphere. Pyrite concentration may be measured indirectly by determining the iron and sulfur concentration in a separated fraction by total digestion and elemental analysis by, for example, inductive coupled plasma (ICP) spectroscopy. The organically bound sulfur concentration is calculated by subtracting the sum of the concentrations of monosulfide, sulfate sulfur, and pyritic sulfur from the total sulfur content. In some cases, coke and coal standards are used as control samples for measuring the accuracy and precision of the analytical procedures. Other methods include, but are not limited to X-ray diffraction, X-ray absorption spectroscopy, X-ray fluorescence spectroscopy, X-ray photoelectron spectroscopy, infrared spectroscopy, Raman spectroscopy, electron microscopy with energy dispersive spectroscopy, and the like.

In certain embodiments, the coal is contacted (i.e., washed or soaked, etc.) with an aqueous medium to provide an aqueous electrolyte medium (i.e., a reactant mixture) that includes pyrite and other sulfur and iron constituents. In some cases, the coal is crushed prior to contacting the coal with the aqueous medium, where the particulate is desirably less than 10 cm in average diameter, such as less than 1 cm in average diameter, and including less than 0.5 cm in average diameter, or smaller, while retaining a size sufficient to be filtered or otherwise readily removed from the aqueous electrolyte medium. In other cases, the coal is not crushed prior to contacting the coal with the aqueous medium. Any suitable aqueous medium may be used, although aqueous electrolyte solutions are readily available. Any electrolyte that provides for conductivity may be used, for example at least 1 mM, such as at least 10 mM, including at least 100 mM, and not more than 10 M, for example not more than 1 M of a conducting electrolyte, e.g. NaCl, etc. In some instances, seawater may be used, as may other media commonly used in fuel cells. In some cases, the aqueous medium includes acid mine drainage. In addition, in embodiments that include microorganisms in the regeneration reactor, aqueous electrolyte media that are compatible with the living conditions required by the microorganisms are used. In certain embodiments, the pH of the aqueous electrolyte medium ranges from 1 to 6, such as from 2 to 5, including from 2.5 to 4. For example, in some cases, the pH of the aqueous electrolyte medium is 6 or less.

In certain embodiments, coal is configured in one or more leach piles for contacting with the aqueous medium. As used herein, the term "leach pile" refers to mineralized materials stacked such that desired minerals can be effectively and selectively dissolved by leaching. In some cases, the leach piles may include one or more layers. In certain cases, the layers have a height ranging from 1.5 m to 15 m, such as 3 m to 10 m, including 5 m to 10 m. In some cases, the leach pile includes 5 to 100 layers, such as 10 to 80 layers, including 10 to 50 layers, for example, 10 to 30 layers.

In some cases, the aqueous electrolyte medium further includes a source of oxygen. In these cases, the aqueous electrolyte medium may be aerated with air or oxygenated with oxygen by any means known to those of skill in the art. In these cases, diffusion of oxygen into the aqueous electrolyte medium may facilitate the reaction.

In certain embodiments, the aqueous electrolyte medium further contains a source of carbon. In these cases, the source of carbon may be carbon dioxide ($CO_2$). In some instances, the source of carbon may be $CO_2$-laden flue gas. The term "flue gas" refers to the combustion exhaust gas produced at power plants from the combustion of an organic fuel (e.g. fuels containing primarily carbon) with oxygen. Thus, in certain embodiments, the source of carbon may be $CO_2$ from the combustion of coal at a power plant, or from the combustion of coal carried out specifically for the presently disclosed process.

In addition, in other embodiments, the source of carbon may be $CO_2$ produced by a microorganism that produces $CO_2$ from coal. In these embodiments, a suite of microorganisms is used where one or more species of microorganisms oxidize the carbon in coal, thereby producing $CO_2$ without combustion. Subsequently, one or more species of microorganisms use the non-carbon constituents of coal as a fuel source, and the $CO_2$ as a carbon source to produce energy, as described herein. In certain embodiments, the suite of microorganisms using $CO_2$ as the carbon source, leave the carbon in solid form, thereby facilitating a reduction of carbon emissions into the atmosphere. In certain embodiments, the coal is not used in a secondary process of conventional combustion, thus electricity is produced without generating $CO_2$.

In certain embodiments, the electrochemical power generation system has electrodes, such as an anode and a cathode. In certain instances, the electrodes of the electrochemical power generation system are electrically conductive. Exemplary conductive electrode materials include, but are not limited to, zinc, reticulated vitreous zinc, crimped zinc, ridged zinc, magnesium, lead, nickel, silicon nanowires, carbon fiber, brush electrodes, lithium compounds, tubular cathode on hydrophobic side, graphite rods, graphite disks, graphite plates, graphite granules, graphite felt, stainless steel rods, carbon cloth, carbon paper, Toray carbon paper, carbon granules, carbon foam, carbon beads, reticulated vitreous carbon, reticulated vitreous carbon foam, air cathodes, gold, gold-plated substrates, platinum, platinized substrates, or cobalt tetramethylphenylporphyrin (CoTMPP), carbon felt, carbon wool, graphite, porous graphite, graphite powder, a conductive polymer, metal-sulfides, pyrite, iron pyrite, sulfur, a conductive metal, plated steel, platinum-plated aluminum, gold-plated aluminum, and combinations thereof.

In some cases, anode materials include, but are not limited to, carbon fiber, carbon cloth, carbon paper, carbon granules, carbon foam, carbon beads, and reticulated vitreous carbon; metal-sulfides, pyrite, iron pyrite, sulfur, graphite in the form of plates, rods, granules, disks, or felt; and the like. In some instances, electrically conductive materials included in a cathode include carbon cloth, carbon paper, carbon wool, carbon foam, reticulated vitreous carbon foam, a conductive but corrosion resistant metal such as, but not limited to, titanium, platinum, rhodium, palladium, magnesium, lead, nickel, and ruthenium, a conductive polymer, and combinations thereof. In certain embodiments, the cathode may include a catalyst metal, such as a noble metal. For example, suitable catalyst metals include platinum, nickel, copper, tin, iron, palladium, cobalt, tungsten, and alloys of such metals. While a catalyst metal such as platinum is included in a cathode in one embodiment, the platinum content may be reduced, for example to about 0.1 $mg/cm^2$ without affecting energy production. Other cathodes include cobalt tetramethylphenylporphyrin (CoTMPP), silicon nanowires, etc.

In certain embodiments, the electrode materials can include lead (Pb) and lead (IV) dioxide ($PbO_2$). In some embodiments, when Pb and $PbO_2$ electrodes are used, the power density is at least 5 $W/cm^2$, such as at least 10 $W/cm^2$, including at least 17 $W/cm^2$, for example at least 20 $W/cm^2$.

An anode and cathode may have any of various shapes and dimensions and may be positioned in various ways in relation to each other. In one embodiment, the anode and the cathode each have a longest dimension, and the anode and the cathode are positioned such that the longest dimension of the anode is parallel to the longest dimension of the cathode. In another exemplary embodiment, the anode and the cathode each have a longest dimension, and the anode and the cathode are positioned such that the longest dimension of the anode is perpendicular to the longest dimension of the cathode. In other instances, the anode and the cathode may be positioned such that the longest dimension of the anode is at an angle in the range between 0 and 180 degrees with respect to the longest dimension of the cathode. In some cases, the spacing between the anode and cathode is 5 cm or less, such as 3 cm or less, including 1 cm or less, which facilitates the minimization of internal resistance of the system.

Electrodes of various sizes and shapes may be included in the electrochemical power generation system. In general, an anode has a surface having a surface area present in the reaction chamber and the cathode has a surface having a surface area in the reaction chamber. In one embodiment, a ratio of the total surface area of anodes to surface area of cathodes in the fuel cell is about 1:1. In one embodiment, the anode surface area in the reaction chamber is greater than the cathode surface area in the reaction chamber. In particular instances, this arrangement may have a lower cost where a cathode material is expensive, such as where a platinum electrode or catalyst is included. In certain embodiments, the electrodes are zinc, reticulated vitreous zinc, crimped zinc, ridged zinc, or combinations thereof. In these cases, crimped zinc may have at least 10 holes/in$^2$, such as at least 100 holes/in$^2$, for example at least 300 holes/in$^2$, including at least 600 holes/in$^2$, or more to increase the amount of surface area in contact with the aqueous electrolyte medium.

Optionally, a fuel cell includes more than one anode and/or more than one cathode. For example, from 1 to 10,000 or more, such as from 1 to 1,000, including from 1 to 100 anodes and/or cathodes may be provided. The number and placement of one or more anodes and/or one or more cathodes may be considered in the context of the particular application. For example, in a particular embodiment where a large volume of reactant is present, a larger area of anodic surface may be provided. Similarly, a larger area of cathode surface may be appropriate. In certain embodiments, the anode and the cathode comprise an electrode stack. In some cases, the electrode stack includes one or more anode layers and one or more cathode layers, wherein the one or more anode layers and one or more cathode layers are configured in alternating layers. In these embodiments, the anode layers may be connected together in series or in parallel and, similarly, the cathode layers may be connected together in series or in parallel.

In some cases, surface layers and contaminants may accumulate on the surface of the electrodes, causing the electrodes to perform less efficiently. In these cases, the electrodes may be cleaned periodically to remove surface layers and contaminants. For example, the electrodes may be cleaned by mechanical abrasion or by dipping the electrode in a light acid, for example hydrochloric acid. In some cases, the electrodes may be cleaned by reversing the flow of electrolyte through the system. Thus, in some embodiments, the systems further include one or more pressure jets configured to reverse the flow of electrolyte through the system.

In certain embodiments, the anode may be partially or wholly embedded in the coal, and the cathode may be partially embedded in the coal. In some embodiments, a permeable barrier separates the anode and the cathode. In other embodiments, the anode and cathode are not separated by a permeable barrier. Thus, a permeable barrier is optionally disposed between the anode and the cathode. In cases that include a permeable barrier, the permeable barrier may be a proton or ion exchange membrane that is permeable to one or more selected ions. In these embodiments, the ion exchange membrane may be a cation exchange membrane permeable to protons, such as a proton exchange membrane. Suitable proton exchange membrane materials include, but are not limited to perfluorinated sulfonic acid polymers such as tetrafluoroethylene and perfluorovinylether sulfonic acid copolymers, and derivatives thereof. Specific examples include Nafion®, such as Nafion® PFSA Membranes N-115, N-117, N-1110, and derivatives produced by E.I. du Pont de Nemours & Co., Wilmington, Del. In certain embodiments, the permeable barrier may be configured as a bag, which in some cases holds the coal used in the electrochemical power generation system.

Aspects of the electrochemical power generation system may be varied to facilitate the oxidation of non-carbon constituents of coal. Parameters such as, but not limited to the aqueous electrolyte composition, the type and composition of electrodes, the pH, the temperature, the type of microorganisms used, etc. may be varied depending on the composition of the reactant mixture. For example, pyrite can occur in several different morphologies (e.g. cubic, framboidal, and the like). In such cases, aspects of the system may be varied, as discussed above, depending on the morphology of pyrite to facilitate its oxidation.

The electrochemical power generation system may be configured as a self-contained or static system in particular embodiments. Thus, for example, a quantity of reactant mixture is included in the system and no additional reactant (aqueous electrolyte medium) is added. In other options, additional reactant mixture is added at intervals or continuously such that the system operates as a batch processor or as a continuous flow system. In these embodiments, the non-carbon constituents of the reactant mixture may be regenerated and recirculated to the system, as described above.

In certain embodiments, the system has one or more drains spaced along one or more sides or the bottom of the housing for containing the aqueous electrolyte medium. The drains facilitate the removal of layers of organisms, fossil fuel solids, pyrite, sulfur, etc. that have stratified, thereby allowing concentration of the aqueous electrolyte medium with the desirable constituents used for electricity or hydrogen production, as described above. For example, in some cases, coal can be removed through the one or more drains. In certain cases, additional coal or other material can be added to the system to act as a substrate to collect and concentrate the pyrite and other precipitates, including metals such as, but not limited to, aluminum, copper, titanium, iron, magnesium, cobalt, and the like. Thus, in certain embodiments, the subject systems may be configured to facilitate the recovery of metals from the aqueous electrolyte medium.

In a further embodiment, a wall of the reaction chamber includes two or more portions such as a structural portion and an electrode portion. A structural portion provides structural support for forming and maintaining the shape of the reaction chamber, as in a conventional wall. An electrode portion of a wall may provide structural support for the reaction chamber and in addition has a functional role. In such an embodiment, the structural portion and electrode portion combine to form a wall defining the interior of the reaction chamber. In a specific embodiment, the electrode portion of the wall includes the cathode. Further, a support structure for supporting an anode or cathode may be included in an electrode portion of the wall. Such a support structure may further provide structural support for forming and maintaining the shape of the reaction chamber. In certain embodiments, the reaction chamber is an open vessel, such that the surface of the aqueous electrolyte medium is exposed to the surrounding environment.

In some embodiments, the subject system produces hydrogen in addition to, or in lieu of electricity. This hydrogen may be used as a fuel source for internal combustion engines, gas turbines, boilers, Stirling engines, or the like. For example, in some embodiments, the hydrogen is combined with air producing a hydrogen fuel mixture. Thus, in these embodiments, the subject method may further include combining the hydrogen generated by the system with air to produce a hydrogen fuel mixture. In some cases, the hydrogen fuel mixture includes 4% or less hydrogen of the total volume, such as 3% or less hydrogen of the total volume, including 1.5% or less of the total volume to facilitate the safe handling of the hydrogen fuel mixture. In certain embodiments, the hydrogen fuel mixture may be combined with vent gasses from coal mines, which may comprise 1% methane or more. In some cases, the hydrogen fuel mixture is then used as a fuel source for an internal combustion engine, gas turbine, or the like. In these instances, the hydrogen fuel mixture is compressed by the engine or gas turbine and is fed into the combustion chamber where, in some embodiments, the hydrogen fuel mixture is combined with regular fuel, such as but not limited to oil, gas, methane, etc. The energy value produced by the hydrogen fuel mixture during combustion contributes to the total energy production by the engine, thereby reducing the amount of regular fuel that the engine requires to achieve a given output. In some gas turbines with high compression ratios this can reduce fuel consumption by as much as 50% or more.

A hydrogen gas collection system is optionally included in a system configured to produce hydrogen, such that the hydrogen gas generated is collected and may be stored for use, or directed to a point of use, such as to a hydrogen fuel powered device. For example, a hydrogen gas collection unit may include one or more hydrogen gas conduits for directing a flow of hydrogen gas to a storage container or directly to a point of use. A hydrogen gas conduit is optionally connected to a source of a sweep gas. For instance, as hydrogen gas is initially produced, a sweep gas may be introduced into a hydrogen gas conduit, flowing in the direction of a storage container or point of hydrogen gas use. A collection system may further include a conduit for passage of hydrogen. The conduit and/or container may be in gas flow communication with a channel provided for outflow of hydrogen gas from the reaction chamber. In certain embodiments, the conduit and/or container are in gas flow communication with the cathode, for example where the cathode is a gas cathode. In certain embodiments, the hydrogen can be used to provide energy for chemical and/or biological reactions that regenerate the pyrite in the spent aqueous electrolyte medium, as described in detail above.

An example of an electrochemical power generation system of the invention is provided in FIG. 1, where the system 10 comprises a catholyte chamber 25 filled with a reactant mixture or suspension of the invention. A cathode 30 is operably connected through a conduit for electrons 20 (i.e., an electrical conductor) to a connected load or power source 15. The catholyte chamber is optionally separated from the anodolyte chamber 45 by an optional permeable barrier 35. The anodolyte chamber 45 is filled with a reactant mixture or suspension of the invention. An anode 40 is operably connected through a conduit for electrons 20 (i.e., an electrical conductor) to a connected load or power source 15. In certain embodiments, the aqueous electrolyte medium can be produced in an electrolyte make-up tank 60, where an aqueous medium is contacted with non-carbon constituents of a fossil fuel, thus producing the aqueous electrolyte medium. In certain embodiments, the aqueous electrolyte medium is transferred from the electrolyte make-up tank 60 to an electrolyte holding tank 55, where the aqueous electrolyte medium may be stored until being transferred to the fuel cell 10 for use.

Figure 2:
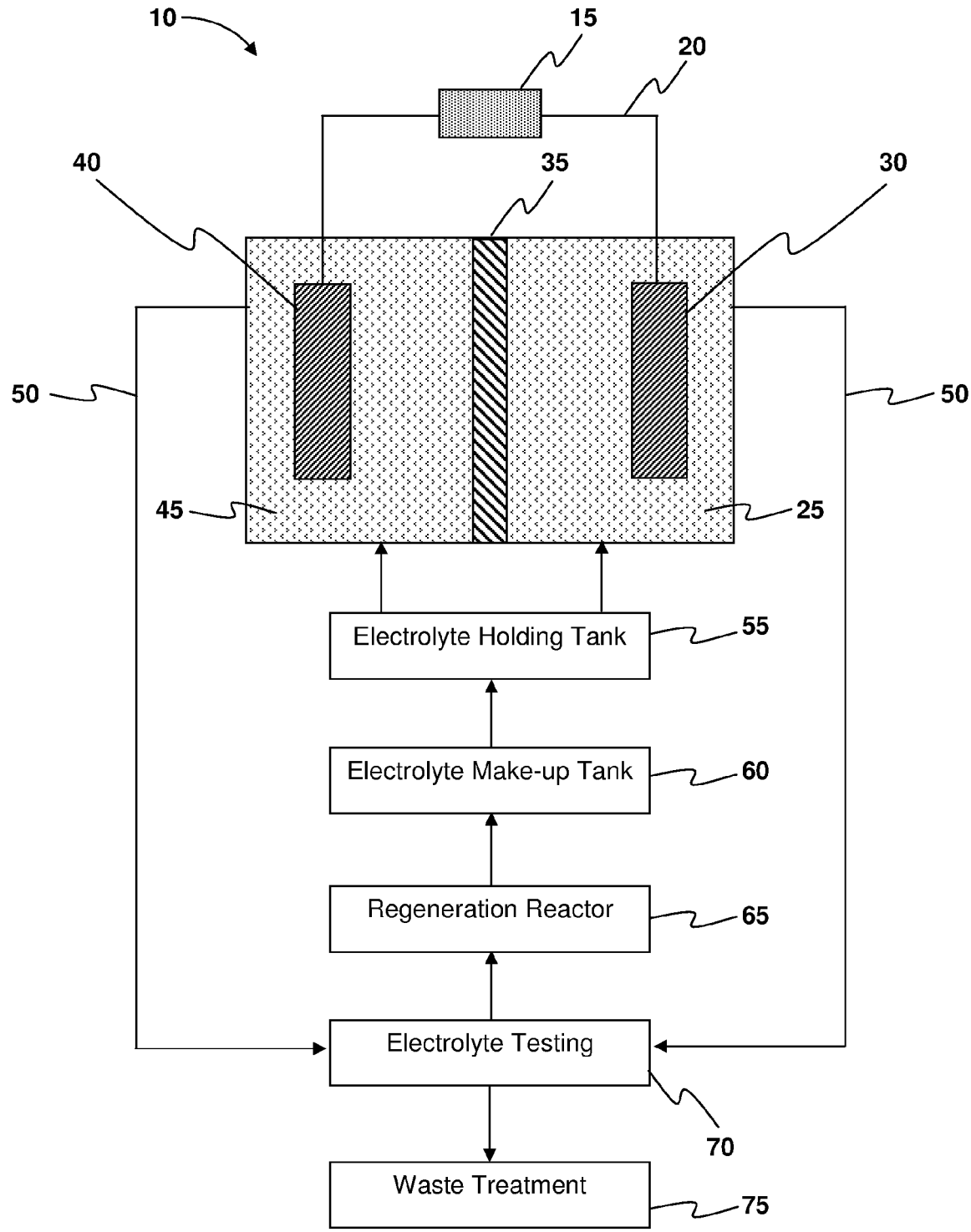
FIG. 2 shows a schematic drawing of an electrochemical power generation system with a regeneration reactor as described herein.

An example of an electrochemical power generation system configured to regenerate pyrite (or other iron sulfide solid) is provided in FIG. 2, where the system 10 comprises a catholyte chamber 25 filled with a reactant mixture or suspension of the invention. A cathode 30 is operably connected through a conduit for electrons 20 (i.e., an electrical conductor) to a connected load or power source 15. The catholyte chamber is optionally separated from the anodolyte chamber 45 by an optional permeable barrier 35. The anodolyte chamber 45 is filled with a reactant mixture or suspension of the invention. An anode 40 is operably connected through a conduit for electrons 20 (i.e., an electrical conductor) to a connected load or power source 15. In certain embodiments, the reactant mixture may be removed 50 from the anodolyte chamber 45 and/or the catholyte chamber 25. In some cases, the reactant mixture is tested 70, as described above. The non-carbon constituents of the aqueous electrolyte medium, such as pyrite, can be regenerated in regeneration reactor 65, through chemical or biological processes, as described above. The resulting pyrite-laden regenerated reactant mixture from regeneration reactor 65 may then be transferred to electrolyte make-up tank 60, where additional aqueous electrolyte medium can be added. The resulting aqueous electrolyte medium can then be optionally transferred to an electrolyte holding tank 55, or can be transferred to the anodolyte chamber 45 and/or the catholyte chamber 25.

An aspect of the electrochemical power generation system is that the overall reaction to generate energy from the non-carbon constituents of coal is energetically favorable. The following reactions are found for non-carbon coal constituents, which constituents readily undergo oxidative dissolution from coal in an oxygenated aqueous medium.

$$2FeS_2 + 7O_2 + 2H_2O \rightarrow 2Fe^{2+} + 4SO_4^{2-} + 4H^+ \qquad (Eq. 1)$$

The number of electrons transferred in Equation 1 is 28.

$$4Fe^{2+} + O_2 + 4H^+ \rightarrow 4Fe^{3+} + 2H_2O \qquad (Eq. 2)$$

The number of electrons transferred in Equation 2 is 4.

$$4Fe^{3+} + 12H_2O \rightarrow 4Fe(OH)_3 + 12H^+ \qquad (Eq. 3)$$

The overall reaction for 32 electrons transferred is therefore:

$$FeS_2 + 7/2O_2 + H_2O \rightarrow Fe(OH)_3 + 2SO_4^{2-} + 4H^+ \qquad (Eq. 4)$$

With the production of $Fe^{3+}$, a secondary oxidative pathway can ensue as shown in Equation 5, below.

$$FeS_2 + 14Fe^{3+} + 8H_2O \rightarrow 15Fe^{2+} + 2SO_4^{2-} + 16H^+ \qquad (Eq. 5)$$

The number of electrons transferred in Equation 5 is 14.

When $FeS_2$ is oxidized with oxygen in the presence of water, the overall reaction is that shown in Equation 4, which gives rise to a thermodynamically favorable (i.e., spontaneous) reaction with a standard state Gibb's Free Energy ($\Delta G°$) of $-1799$ kJ/mol.

In additional embodiments, a modular electrochemical power generation system is provided, where the modular system comprises a plurality of the presently described systems. In these cases, the modular system may include two or more electrochemical power generation systems, such as 10 or more, for example, 100 or more, including 1000 or more, for instance 10,000 or more. In these embodiments, the modular system produces power outputs ranging from at least 1 W, such as at least 1 kW, including at least 1 MW, for example, at least 200 MW.

In additional embodiments of the present invention, the electrochemical power generation system may be configured to operate as a battery. Thus, the battery can store energy in the form of chemical energy and then later convert the chemical energy to electrical energy. For example, as described above with respect to the subject electrochemical power generation systems, the battery can similarly produce energy from non-carbon constituents of a fossil fuel, such as pyrite. In further embodiments, the battery can be configured to be a rechargeable battery. In these embodiments, similar to the systems as described in detail above, the battery can further include a regeneration reactor for the regeneration of pyrite. Additional aspects of the battery are as described herein with respect to the systems of the present invention.

Methods

Methods for obtaining energy from non-carbon constituents of a fossil fuel are provided. In certain embodiments, the method includes the steps of contacting the fossil fuel with an aqueous medium to produce an aqueous electrolyte medium (i.e., a reactant mixture) that includes oxidizable non-carbon constituents of the fossil fuel, and oxidizing the reactant mixture in an electrochemical power generation system to obtain energy at a temperature below the oxidation temperature of carbon. In certain embodiments, the method further includes the step of regenerating the non-carbon constituents of the fossil fuel. In certain embodiments, the non-carbon constituents of the fossil fuel comprise iron pyrite, pyrite group minerals, iron, iron-containing compounds, sulfur, sulfur-containing compounds, or combinations thereof. In some cases, the non-carbon constituent of the fossil fuel is pyrite. In certain embodiments, the subject systems find use in the subject methods.

As discussed above, in some instances, the fossil fuel includes coal, tar sands, oil shale, heavy oil, crude oil, or mixtures thereof. In certain cases, the fossil fuel is coal. In these cases, the method may further include crushing the coal prior to contacting the coal with the aqueous electrolyte medium. In other cases, the coal is not crushed prior to contacting the coal with the aqueous electrolyte medium.

In certain embodiments, the method further includes testing the reactant mixture. For instance, the testing may include, but is not limited to detecting one or more of the following: energy content, energy density, pH, pyrite concentration, sulfur concentration, iron concentration, carbon concentration, oxygen concentration, electrolyte concentration, and the like. The testing can occur before the non-carbon constituents of the fossil fuel are regenerated, after the non-carbon constituents of the fossil fuel have been regenerated, or both before and after the non-carbon constituents of the fossil fuel have been regenerated. If the testing indicates that the aqueous electrolyte medium is not suitable for regeneration or for use in the fuel cell, then the aqueous electrolyte medium can be removed from the system for waste treatment and safe disposal. In addition, as discussed above, the method may further include recovering metals, such as, but not limited to, aluminum, copper, titanium, iron, magnesium, cobalt, and the like, from the aqueous electrolyte medium.

As discussed above, the subject methods include regenerating the non-carbon constituents of the fossil fuel. In certain embodiments, the non-carbon constituents of the fossil fuel can be regenerated chemically. In these embodiments, the regenerating includes removing a portion of the reactant mixture and contacting the removed portion of the reactant mixture with a source of energy to regenerate pyrite and produce a regenerated reactant mixture. In further embodiments, the method further includes contacting the regenerated reactant mixture with the reactant mixture of the subject system.

In certain embodiments, the non-carbon constituents of the fossil fuel can be regenerated biologically. In these embodiments, the regenerating comprises removing a portion of the reactant mixture and contacting the removed portion of the reactant mixture with at least one species of microorganism to regenerate pyrite and produce a regenerated reactant mixture. In certain embodiments, the energy for the microorganisms can come from coal, AMD, solar energy, electricity making hydrogen, biomass, flue gas, and the like. In some cases, the at least one species of microorganism includes a sulfate reducing bacteria or a sulfur reducing bacteria. In some embodiments, the at least one species of microorganism includes a microorganism that reduces ferric iron to ferrous iron. In further embodiments, the method further includes contacting the regenerated reactant mixture with the reactant mixture of the subject system.

In additional embodiments, the method further includes contacting the regenerated reactant mixture with additional aqueous electrolyte medium in an electrolyte make-up tank to produce a combined aqueous electrolyte medium. In some cases, the additional electrolyte medium can be made by contacting a fossil fuel with an aqueous electrolyte medium, as described above. In other cases, the additional electrolyte medium can be an electrolytic fluid, such as, but not limited to seawater, acid mine drainage, and the like. In further embodiments, the combined aqueous electrolyte medium may then be used in the subject system, or optionally stored in a holding tank or pit before being used in the system.

In some cases, the energy produced by the electrochemical power generation system is electrical energy. In other cases, the subject system produces hydrogen in addition to, or in lieu of electricity. This hydrogen may subsequently be used as a fuel source. In these cases, the subject methods may further include combining the generated hydrogen with air to produce a hydrogen fuel mixture, which can then be used as a fuel source for internal combustion engines, gas turbines, boilers, Stirling engines, and the like. In certain embodiments, the subject methods further include contacting the reactant mixture with a source of oxygen. In some cases, the subject methods further include contacting the reactant mixture with a source of carbon. In these cases, the source of carbon may be $CO_2$ or $CO_2$-laden flue gas. In further embodiments, the subject methods may further include cleaning an electrode of the fuel cell, as discussed above. In some instances, methods of cleaning an electrode of the fuel cell include, but are not limited to mechanical abrasion, contacting the electrode with a light acid (e.g. hydrochloric acid), and the like. In some cases, the cleaning includes reversing the flow of electrolyte through the system, as described above.

Figure 3:
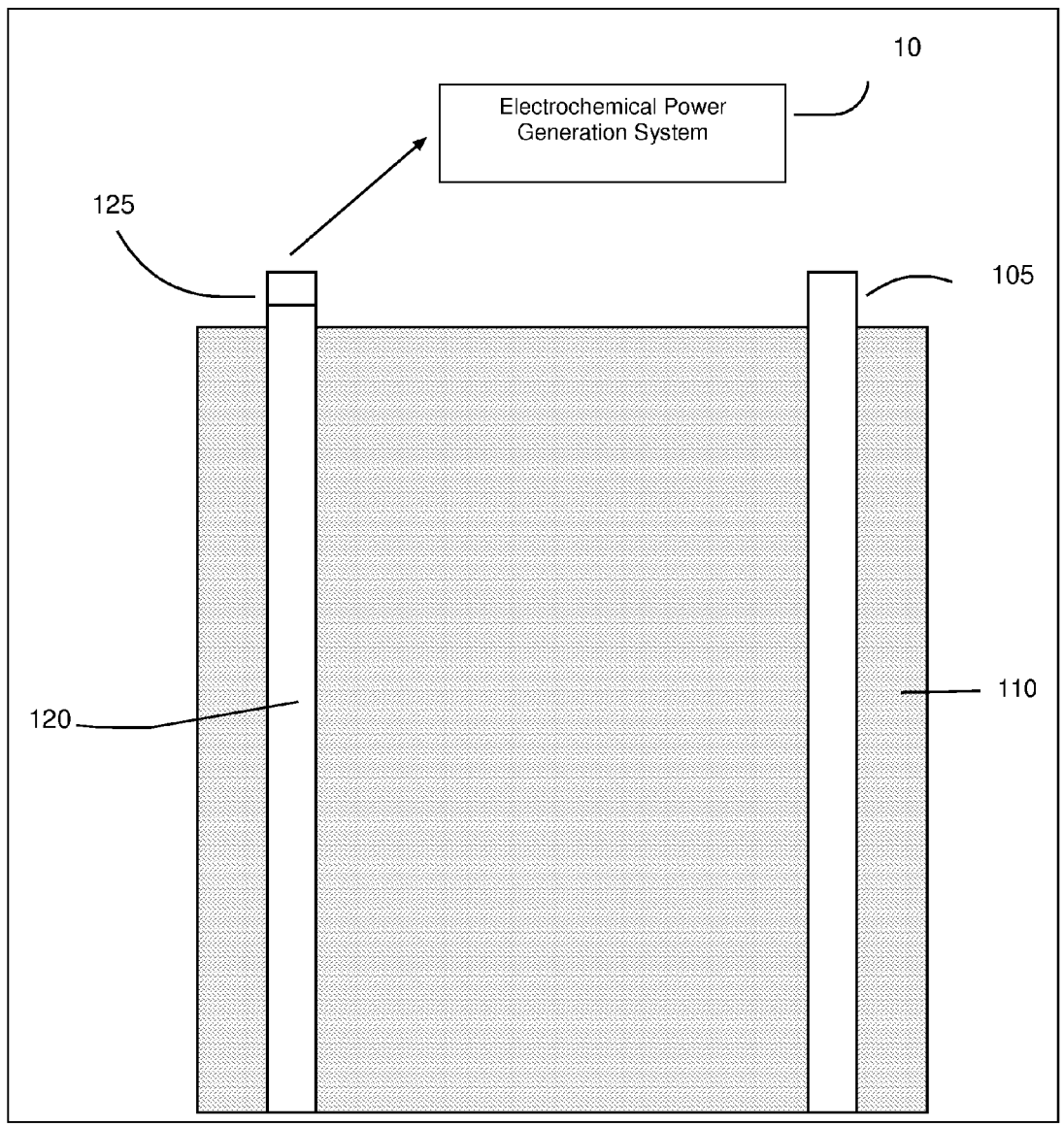
FIG. 3 shows a schematic drawing of an in situ wash system for delivering non-carbon constituents of coal to an electrochemical power generation system as described herein.

In certain embodiments, the step of contacting the coal with the aqueous medium is performed in situ. Methods have been described in the art for the use of steam to fluidize coal deposits. While such methods may find use in the methods of the present invention, lower temperatures may also be used for the present invention, as it is not necessary to include significant amounts of hydrocarbons in the reactant mixture. An example of an in situ extraction is shown in FIG. 3, where water, acid mine drainage, or steam is input through a well 105 into a coal deposit 110. The liquid or gas is washed through the deposit, and returned carrying non-carbon coal constituents through a well 120, which is optionally filtered through a filter 125 to remove particulates, and then provided to an electrochemical power generation system 10 in a batch or continuous process.

There are various methods available for use in converting non-carbon constituents of coal from a solid to a fluid in situ. In certain embodiments, an additive may be added to the water used for in situ extraction. In some cases, the additive facilitates leaching of non-carbon constituents of coal into the aqueous medium. In some instances, the additive can be, but is not limited to the following: an acid, such as but not limited to sulfuric acid; a microorganism; and the like. In certain cases, the method of in situ extraction further includes increasing the surface area of the coal deposit. In these embodiments, the surface area of the coal deposit may be increased by blasting with explosives, drilling, fracturing the deposit with high pressure water, and the like.

In some instances, the aqueous electrolyte medium used in the electrochemical power generation system may include acid mine drainage or acid rock drainage. The term "acid mine drainage" or "acid rock drainage" refers to the outflow of acidic water from abandoned metal or coal mines. However, other areas where the earth has been disturbed (e.g. construction sites, subdivisions, transportation corridors, etc.) may also contribute acid rock drainage to the environment.

In some instances, acid mine drainage and acid rock drainage, such as the liquid that drains from coal stocks, coal handling facilities, coal washeries, and coal waste tips, etc. can be highly acidic. For example, the pH of acid mine drainage and acid rock drainage may be 5 or less, such as 3 or less, including 1 or less. Acid rock drainage occurs naturally within some environments as part of the rock weathering process but is exacerbated by large-scale earth disturbances characteristic of mining and other large construction activities. In certain embodiments, the systems disclosed herein may facilitate an increase in the pH of acid mine drainage and acid rock drainage streams to a pH of 1 or more, such as 3 or more, including 5 or more.

Additional aspects of the subject invention include a method for producing a liquid fuel with a standardized energy density. As used herein, the terms "standard" and "standardized" are interchangeable and refer to values that are within a pre-determined range. For example, in certain embodiments, the standardized energy density ranges from 6,000 btu per gallon to 200,000 btu per gallon, such as from 6,000 btu per gallon to 135,000 btu per gallon, including from 6,000 btu per gallon to 70,000 btu per gallon. In certain embodiments, the liquid fuel is an aqueous electrolyte medium for use in the subject systems as described above. In some cases, the liquid fuel can include acid mine drainage. In certain instances, the method includes the steps of contacting a fossil fuel with an aqueous medium to produce a liquid fuel that includes oxidizable non-carbon constituents of the fossil fuel. In certain instances, the aqueous medium is acid mine drainage. In some cases, the method further includes testing the liquid fuel. In some cases, the testing can include, but is not limited to detecting one or more of the following parameters: energy content, energy density, pH, pyrite concentration, sulfur concentration, iron concentration, carbon concentration, oxygen concentration, and electrolyte concentration. The results of the testing can be compared to target values for each of the desired parameters, where the target values correspond to a liquid fuel with a standardized energy density. In certain embodiments, the method further includes adjusting the liquid fuel, such that the liquid fuel has the target energy density. For example, if testing determines that the concentration of pyrite in the liquid fuel is too low, then the adjusting can include the addition of pyrite to the liquid fuel until the concentration of pyrite reaches the target value. Alternatively, if the testing determines that the concentration of pyrite in the liquid fuel is too high, then the adjusting can include the addition of aqueous medium to the liquid fuel until the concentration of pyrite in the liquid fuel reaches the target value.

Utility

As can be seen, the electrochemical power generation systems of the present invention find use in a variety of different applications where it is desirable to produce energy from the non-carbon constituents of fossil fuels. In some embodiments, the systems of the present disclosure can be used for the production of energy in conjunction with a coal mine. In these embodiments, fossil fuel used in the system can be pyrite-laden coal. In some cases, the energy produced by the system can be used to supply all or a portion of the energy needs for the coal mine. In some embodiments, the systems disclosed herein find use in locations where there is acid mine drainage. In these embodiments, the aqueous electrolyte medium used in the systems can include acid mine drainage. As discussed above, the systems may facilitate an increase in the pH of acid mine drainage streams to a pH of 1 or more, such as a pH of 3 or more, including a pH of 5 or more.

In some instances, the systems disclosed herein find use as a part of a modular system for producing energy. As used herein, the term "modular" refers to one or more self-contained systems that may be connected together into a larger system, where individual modules can be added, removed, or interchanged as units without disassembly of the entire system. In some cases, the modular system can produce energy on a small scale and may include 1 or more of the subject electrochemical power generation systems, such as 5 or more, including 10 or more of the subject electrochemical power generation systems. In some cases, the modular system can produce energy on a large scale and may include 100 or more of the electrochemical power generation systems, such as 1000 or more, including 10,000 or more of the subject electrochemical power generation systems. Electrochemical power generation systems of the modular systems can be grouped together and connected in parallel or in series as desired. In embodiments that further include a regeneration reactor configured to regenerate pyrite, the regeneration reactor can have a volume such that the amount of pyrite regenerated by the regeneration reactor is sufficient to provide enough pyrite to fulfill the electrochemical power generation systems' pyrite consumption needs. Thus, in these embodiments, the entire system can be operated independent from the input of external electricity to regenerate pyrite. For example, the regeneration reactor can be configured to regenerate pyrite biologically and the regeneration reactor can have a volume of at least 1 $m^3$, such as at least 100 $m^3$, including at least 1000 $m^3$, for example, at least 10,000 $m^3$, for instance at least 25,000 $m^3$.

In certain embodiments, the electrochemical power generation system finds use for applications such as, but not limited to, baseload power generation, dispatchable power generation, seasonal power, spinning reserve, grid regulation, standby power, and the like.

As can be appreciated from the disclosure provided above, the present disclosure has a wide variety of applications. Accordingly, the following examples are offered for illustration purposes and are not intended to be construed as a limitation on the invention in any way. Those of skill in the art will readily recognize a variety of noncritical parameters that could be changed or modified to yield essentially similar results. Thus, the following examples are put forth so as to provide those of ordinary skill in the art with a complete disclosure and description of how to make and use the present invention, and are not intended to limit the scope of what the inventors regard as their invention nor are they intended to represent that the experiments below are all or the only experiments performed. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Celsius, and pressure is at or near atmospheric.

EXAMPLES

Example 1

A continuous flow electrochemical power generation system was tested using acid mine drainage (AMD) as the aqueous electrolyte medium and reticulated vitreous carbon (RVC)— zinc electrode pairs. At time=zero, started pumping AMD into 1.5 liters of tap water. Three RVC-zinc electrode pairs in switch holders were used. Resistance was set at 100 ohms. $t_{zero}$ V was 0.03V. Pump flow rate was 350 L/h. Sparging was with three tubes, and the initial pH of the AMD was 2.5. The voltage of the fuel cell is shown in Table 1 below.

TABLE 1

| Time (minutes) | Volts | Notes |
|---|---|---|
| 10 | 0.84 | |
| 20 | 1.24 | |
| 30 | 1.27 | |
| 40 | 1.27 | |
| 50 | 1.27 | |
| 170 | 1.22 | |
| 230 | 1.35 | (1.34 mW/cm$^2$) Sparging was increased. |
| 1,080 | 0.87 | |

Example 2

In this example, a static system was used (i.e., no flow-through). One 12 volt lead-acid battery was filled with AMD and tested for power density. The electrode dimensions were as follows: 3 inches wide, 5 inches deep, 5 inches high. The electrode had 15 square inches of face area. Resistance values were varied using a millennium box, and voltages measured. At $t_{zero}$ V=0.915 V. With no load and after the battery was filled with AMD, V=7.0 within minutes. With a decade box and no load, V=0.49 V. The results are shown in Table 2 below.

TABLE 2

| resistance (ohms) | volts | amps | watts | W/cm$^2$ | mW/cm$^2$ |
|---|---|---|---|---|---|
| 0 | 0.8 | | | | |
| 1 | 1.3 | 1.300 | 1.690 | 0.0175 | 17.46 |
| 2 | 1.7 | 0.850 | 1.445 | 0.0149 | 14.93 |
| 3 | 1.9 | 0.633 | 1.203 | 0.0124 | 12.34 |
| 4 | 2.1 | 0.525 | 1.103 | 0.0114 | 11.39 |
| 5 | 2.4 | 0.480 | 1.152 | 0.0119 | 11.90 |
| 6 | 2.5 | 0.417 | 1.042 | 0.0108 | 10.76 |
| 7 | 2.7 | 0.386 | 1.041 | 0.0108 | 10.76 |
| 8 | 2.8 | 0.350 | 0.980 | 0.0101 | 10.13 |
| 9 | 2.9 | 0.322 | 0.934 | 0.0097 | 9.66 |
| 10 | 3.1 | 0.310 | 0.961 | 0.0099 | 9.93 |
| 11 | 3.2 | 0.291 | 0.931 | 0.0096 | 9.62 |
| 12 | 3.3 | 0.275 | 0.908 | 0.0094 | 9.38 |
| 13 | 3.4 | 0.262 | 0.889 | 0.0092 | 9.19 |
| 14 | 3.5 | 0.250 | 0.875 | 0.0090 | 9.04 |
| 15 | 3.6 | 0.240 | 0.864 | 0.0089 | 8.93 |
| 16 | 3.6 | 0.225 | 0.810 | 0.0084 | 8.37 |
| 17 | 3.7 | 0.218 | 0.805 | 0.0083 | 8.32 |
| 18 | 3.7 | 0.206 | 0.761 | 0.0079 | 7.86 |
| 19 | 3.8 | 0.200 | 0.760 | 0.0079 | 7.85 |
| 20 | 3.9 | 0.195 | 0.761 | 0.0079 | 7.86 |
| 40 | 4.7 | 0.118 | 0.552 | 0.0057 | 5.71 |
| 60 | 5.1 | 0.085 | 0.434 | 0.0045 | 4.48 |
| 80 | 5.4 | 0.068 | 0.365 | 0.0038 | 3.77 |
| 100 | 5.6 | 0.056 | 0.314 | 0.0032 | 3.24 |
| 120 | 5.7 | 0.048 | 0.271 | 0.0028 | 2.80 |
| 140 | 5.8 | 0.041 | 0.240 | 0.0025 | 2.48 |
| 160 | 5.9 | 0.037 | 0.218 | 0.0022 | 2.25 |
| 180 | 6 | 0.033 | 0.200 | 0.0021 | 2.07 |
| 200 | 6 | 0.030 | 0.182 | 0.0019 | 1.86 |
| 220 | 6.1 | 0.028 | 0.169 | 0.0017 | 1.75 |
| 240 | 6.1 | 0.025 | 0.155 | 0.0016 | 1.60 |
| 260 | 6.1 | 0.023 | 0.143 | 0.0015 | 1.48 |
| 280 | 6.2 | 0.022 | 0.137 | 0.0014 | 1.42 |
| 300 | 6.2 | 0.021 | 0.128 | 0.0013 | 1.32 |
| 320 | 6.2 | 0.019 | 0.120 | 0.0012 | 1.24 |
| 340 | 6.3 | 0.019 | 0.117 | 0.0012 | 1.21 |
| 360 | 6.3 | 0.018 | 0.110 | 0.0011 | 1.14 |
| 380 | 6.3 | 0.017 | 0.104 | 0.0011 | 1.08 |
| 400 | 6.3 | 0.016 | 0.099 | 0.0010 | 1.03 |

Example 3

Examples were performed using a coal/iron anode and an air cathode. Measurements were taken using a standard decade box and multimeter configuration. The batteries used were Wee-K Enterprises CMAB5A, which include a rubber/plastic housing with five slots, two air cathodes 4"×4" per slot, for a total of 10 air cathodes. The wiring harness was a simple two-wire bus design. The two air cathodes per slot had a wire connecting the two sides, which was connected to the bus at its center. With respect to the anode, the use of pyrite in waste coal (iron and sulfur) as an anode was tested. This configuration significantly reduced the anode cost because the fuel was also the anode. One iron strip 5.5" long by ¾" wide was inserted in each of the five slots and wired to connect to the bus. Two ounces of Scrubgrass coal was placed in each slot. 500 mL simulated AMD type I was used as the electrolyte. Results are shown in Table 3, below.

TABLE 3

| | 16:22 | | 16:45 | |
|---|---|---|---|---|
| ohms | volts | watts | volts | watts |
| 1 | 3.00 | 9.00 | 3.08 | 9.49 |
| 2 | 3.47 | 6.02 | 3.51 | 6.16 |
| 3 | 3.48 | 4.04 | 3.52 | 4.13 |
| 4 | 3.48 | 3.03 | 3.52 | 3.10 |
| 5 | 3.49 | 2.44 | 3.52 | 2.48 |

Example 4

Figure 4:
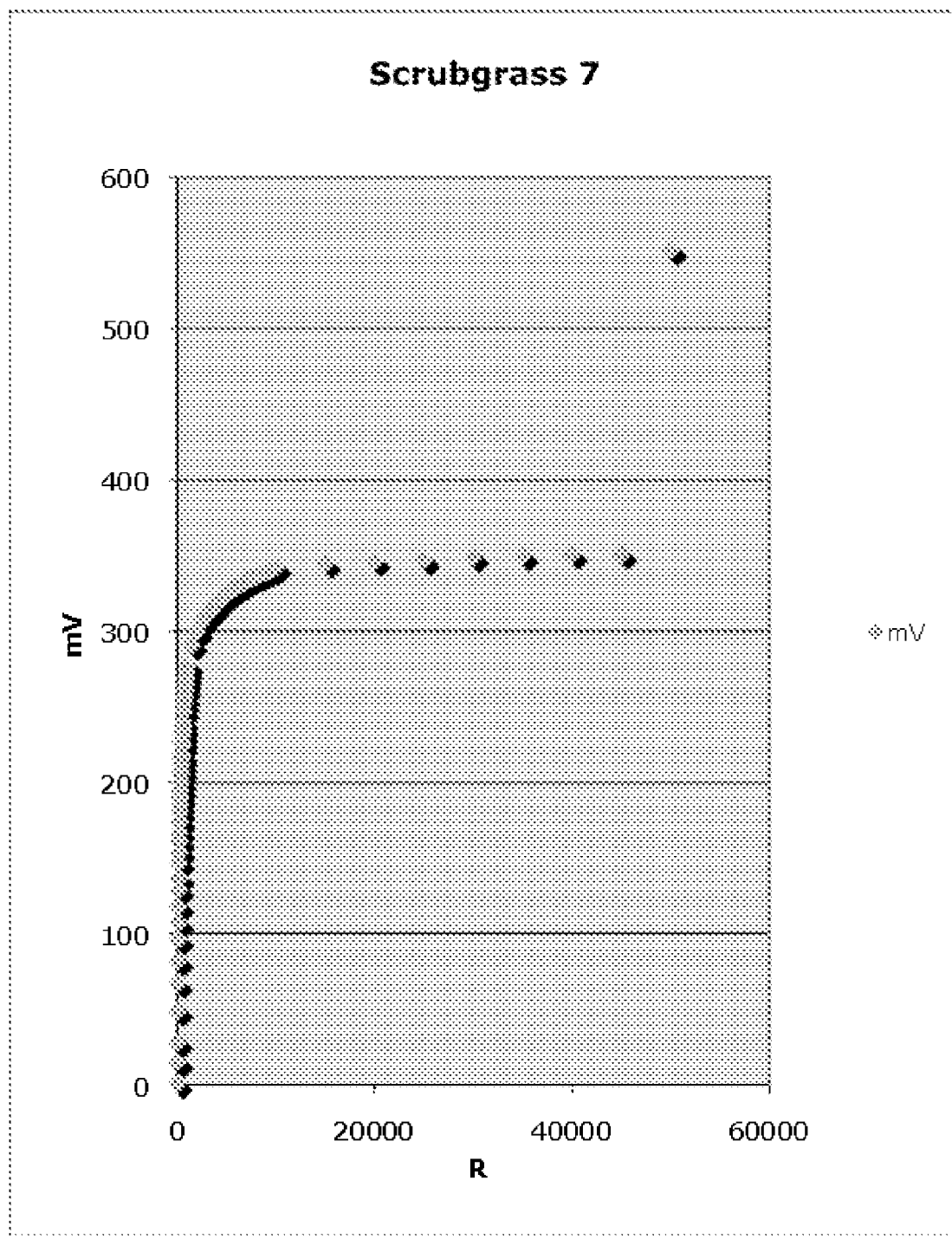
FIG. 4 shows a graph of resistance (ohms) vs. voltage (mV) for an electrochemical power generation system using a coal anode, as described herein.

A coal anode was tested. A piece of NC 1 (a.k.a. Scrubgrass 7) coal was used as one electrode and a graphite bar as the other electrode. 150 g of North Camp waste coal in 450 mL tsp water was used as the electrolyte medium. Results are shown in TABLE 4 below, and are presented in a graph in FIG. 4.

TABLE 4

| Ohms | mV |
|---|---|
| 0 | 0.6 |
| 10 | 15.2 |
| 20 | 28.1 |
| 40 | 49 |
| 60 | 67 |
| 80 | 82 |
| 100 | 96 |
| 120 | 107 |
| 140 | 118 |
| 160 | 129 |
| 180 | 137 |
| 200 | 147 |
| 220 | 154 |
| 240 | 161 |
| 260 | 167 |
| 280 | 174 |
| 300 | 180 |
| 320 | 185 |
| 340 | 190 |
| 360 | 195 |
| 380 | 200 |
| 400 | 205 |
| 420 | 208 |
| 440 | 212 |
| 460 | 216 |
| 480 | 218 |
| 500 | 224 |
| 520 | 227 |
| 540 | 231 |
| 560 | 234 |
| 580 | 237 |
| 600 | 240 |
| 650 | 247 |
| 700 | 252 |
| 750 | 256 |
| 800 | 261 |
| 850 | 265 |
| 900 | 269 |
| 950 | 273 |
| 1000 | 277 |
| 1500 | 291 |
| 2000 | 300 |
| 2500 | 306 |
| 3000 | 311 |
| 3500 | 314 |
| 4000 | 319 |
| 4500 | 321 |
| 5000 | 325 |
| 5500 | 327 |
| 6000 | 329 |
| 6500 | 331 |
| 7000 | 333 |
| 7500 | 335 |
| 8000 | 336 |
| 8500 | 338 |
| 9000 | 339 |
| 9500 | 340 |
| 10000 | 342 |
| 15000 | 345 |
| 20000 | 346 |
| 25000 | 347 |
| 30000 | 349 |
| 35000 | 350 |
| 40000 | 351 |
| 45000 | 351 |
| 50000 | 552 |

Example 5

Figure 5:
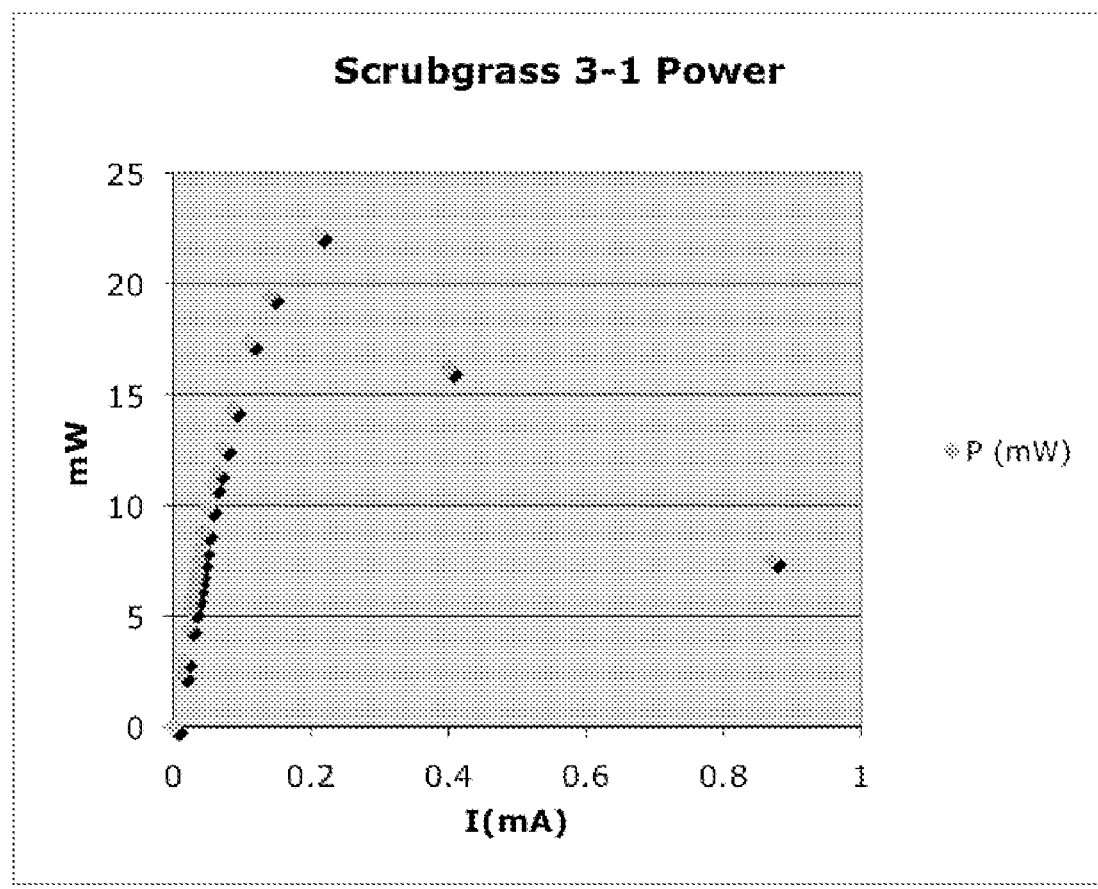
FIG. 5 shows a graph of current, I, (mA) vs. power (mW) for an electrochemical power generation system using carbon paper electrodes, as described herein.

An experiment was performed using carbon paper electrodes. Results are shown in Table 5 below, and in FIG. 5.

TABLE 5

| R | mV |
|---|---|
| 0 | 4.3 |
| 10 | 8.7 |
| 100 | 40.4 |
| 500 | 106 |
| 1000 | 139 |
| 1500 | 158 |
| 2000 | 169 |
| 2500 | 178 |
| 3000 | 186 |
| 3500 | 195 |
| 4000 | 198 |
| 4500 | 200 |
| 5000 | 201 |
| 5500 | 203 |
| 6000 | 205 |
| 6500 | 208 |
| 7000 | 210 |
| 7500 | 211 |
| 8000 | 212 |
| 8500 | 212 |
| 10000 | 214 |
| 15000 | 216 |
| 20000 | 217 |

Example 6

An experiment was performed using 100 grams tap water each in two separate vessels; 68 grams of Scrubgrass coal; copper and zinc electrodes, and water ¼" above the surface of the coal. Results are shown below in Table 6.

TABLE 6

| ohms | mV | mW |
|---|---|---|
| 100 | 751 | 5.64 |
| 1000 | 1893 | 3.58 |

Example 7

An experiment was performed using seawater media (100 grams), 50% Scrubgrass coal, 50% Kentucky1 coal (140 grams), and copper and zinc electrodes. Results are shown in Table 7 below.

TABLE 7

|  | ohms | mV | mW |
|---|---|---|---|
| seawater alone | 100 | 20 | 0.004 |
| 2:51 PM | 100 | 456 | 2.079 |
| 2:55 | 100 | 668 | 4.462 |
| 3:06 | 100 | 758 | 5.746 |
| 5:12 | 100 | 120 | 0.144 |

Example 8

Figure 6:
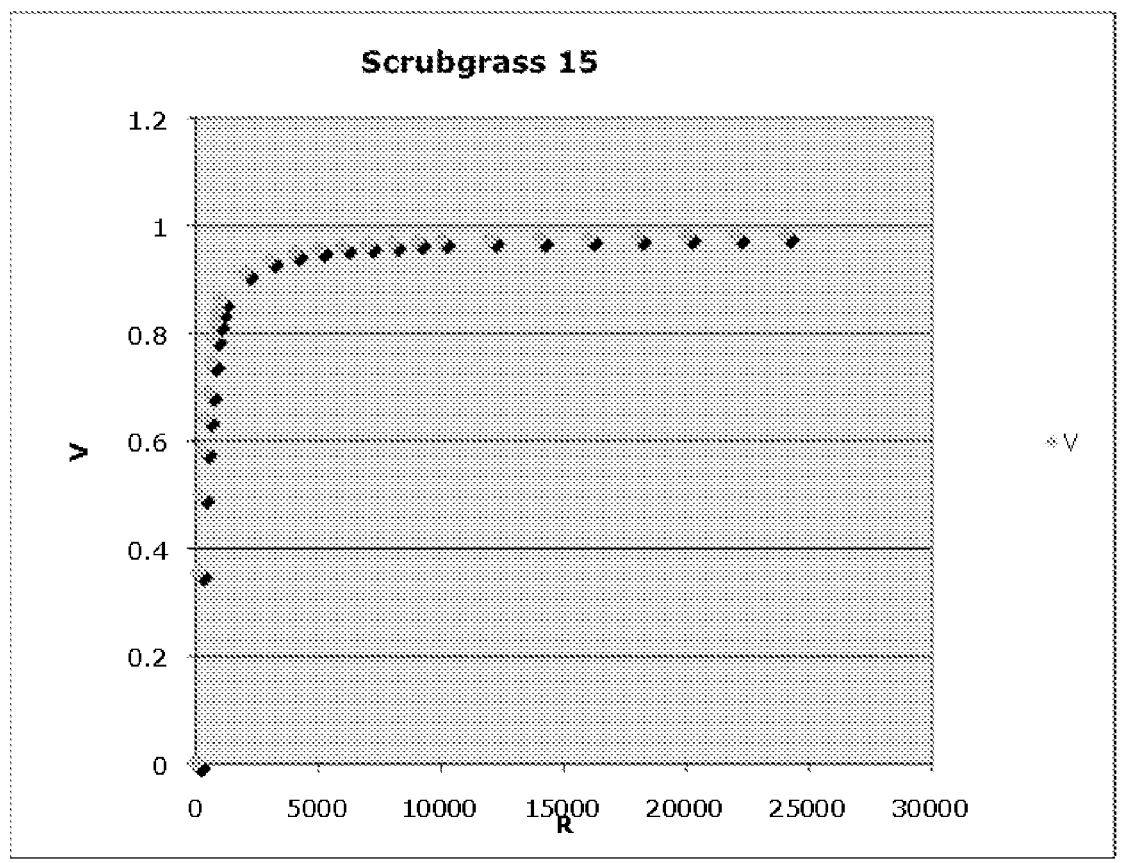
FIG. 6 shows a graph of resistance (ohms) vs. voltage (V) for an electrochemical power generation system using RVC foam and zinc electrodes, as described herein.

An experiment was performed using 200 grams of coal in 800 mL of water in a one liter beaker. Electrodes were RVC foam and one zinc bar, 7 cm apart. Readings were taken at 76 hours. Results are shown in Table 8 below and in FIG. 6.

TABLE 8

| R (ohms) | V |
|---|---|
| 0 | 0.002 |
| 100 | 0.357 |
| 200 | 0.499 |
| 300 | 0.584 |
| 400 | 0.643 |
| 500 | 0.69 |
| 600 | 0.746 |
| 700 | 0.793 |
| 800 | 0.82 |
| 900 | 0.842 |
| 1000 | 0.861 |
| 2000 | 0.915 |
| 3000 | 0.938 |
| 4000 | 0.951 |
| 5000 | 0.958 |
| 6000 | 0.963 |
| 7000 | 0.966 |
| 8000 | 0.969 |
| 9000 | 0.972 |
| 10000 | 0.974 |
| 12000 | 0.976 |
| 14000 | 0.977 |
| 16000 | 0.978 |
| 18000 | 0.98 |
| 20000 | 0.982 |
| 22000 | 0.983 |
| 24000 | 0.984 |

Example 9

Figure 7:
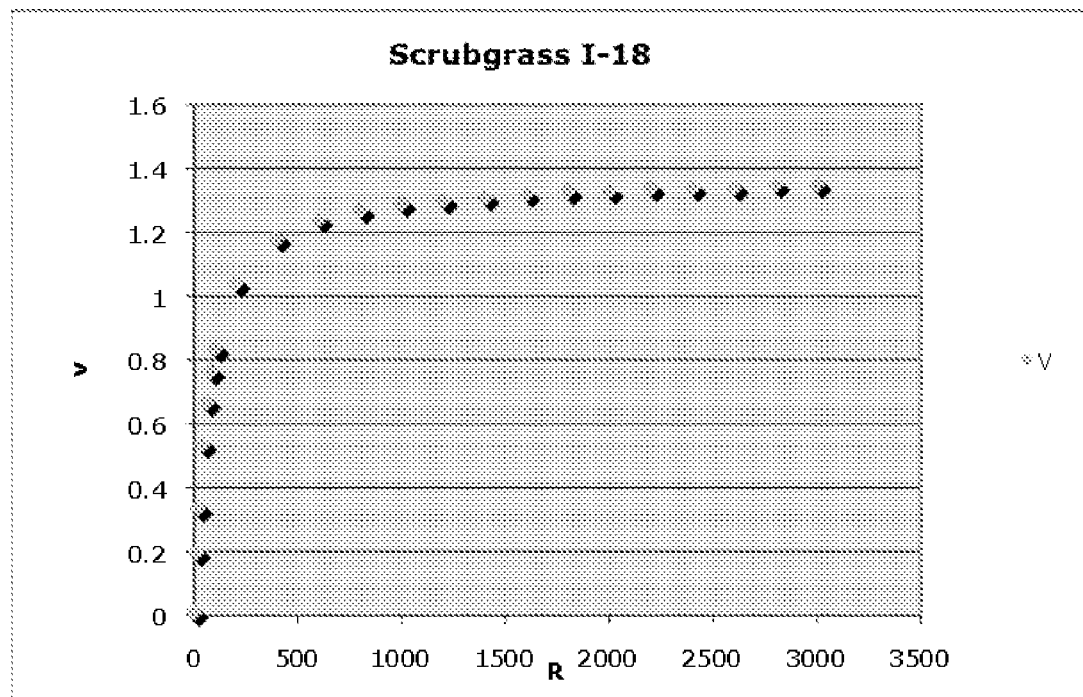
FIG. 7 shows a graph of resistance (ohms) vs. voltage (V) for an electrochemical power generation system using six RVC/Zn electrode pairs, as described herein.

An experiment was performed using 550 g NC-I coal, 750 mL tap water, six RVC/Zn electrode pairs, and sparging with air. First measurements of voltage were taken at time=0. Second set of measurements of voltage were taken after an elapsed time of 17 hours. Results are shown in Table 9 below, and in FIG. 7.

TABLE 9

| R | V |
|---|---|
| 0 | 0.01 |
| 10 | 0.197 |
| 20 | 0.337 |
| 40 | 0.535 |
| 60 | 0.668 |
| 80 | 0.765 |
| 100 | 0.836 |
| 200 | 1.04 |
| 400 | 1.18 |
| 600 | 1.24 |
| 800 | 1.27 |
| 1000 | 1.29 |
| 1200 | 1.3 |
| 1400 | 1.31 |
| 1600 | 1.32 |
| 1800 | 1.33 |
| 2000 | 1.33 |
| 2200 | 1.34 |
| 2400 | 1.34 |
| 2600 | 1.34 |
| 2800 | 1.35 |
| 3000 | 1.35 |

Example 10

Figure 8:
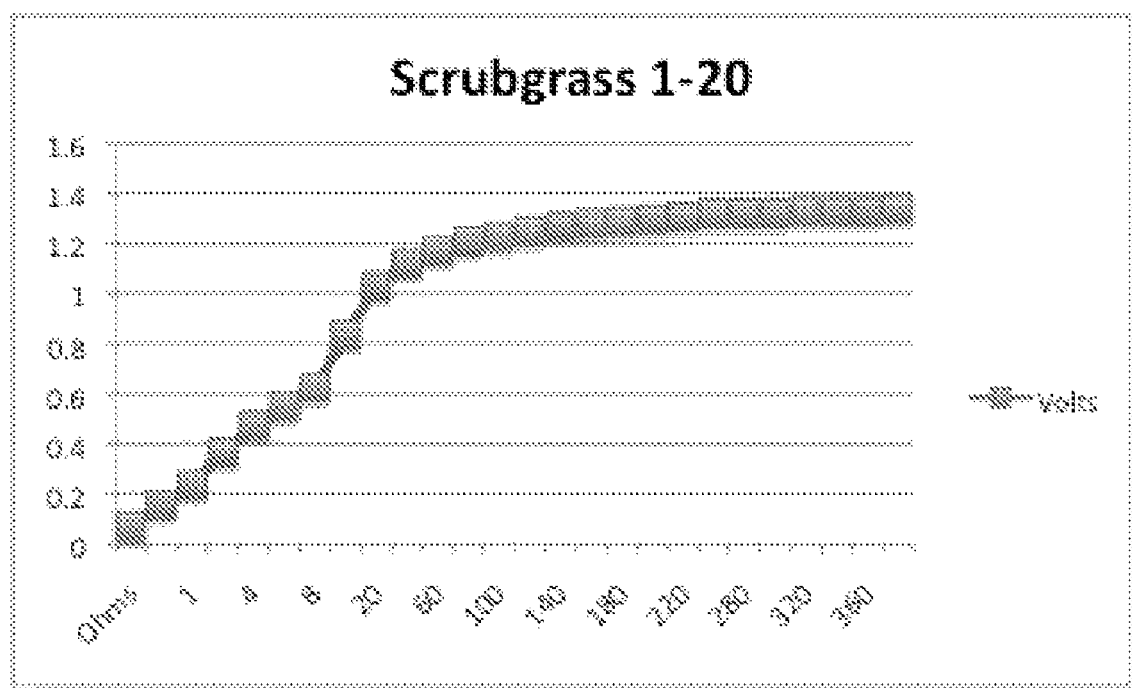
FIG. 8 shows a graph of resistance (ohms) vs. voltage (V) for an electrochemical power generation system using 6 zinc/RVC electrode pairs as described herein.

An experiment was performed using 1.5 liters of water, 300 g coal, 6 zinc/RVC electrode pairs. Readings were taken after 1 hour. This experiment confirmed that increased surface area increased output. Results are shown in Table 10 below, and in FIG. 8.

TABLE 10

| Ohms | Volts |
|---|---|
| 0 | 0.07 |
| 1 | 0.156 |
| 2 | 0.235 |
| 4 | 0.366 |
| 6 | 0.474 |
| 8 | 0.549 |
| 10 | 0.623 |
| 20 | 0.835 |
| 40 | 1.03 |
| 60 | 1.12 |
| 80 | 1.17 |
| 100 | 1.21 |
| 120 | 1.23 |
| 140 | 1.25 |
| 160 | 1.27 |
| 180 | 1.28 |
| 200 | 1.29 |
| 220 | 1.3 |
| 260 | 1.31 |
| 280 | 1.32 |
| 300 | 1.32 |
| 320 | 1.32 |
| 340 | 1.33 |
| 360 | 1.33 |
| 380 | 1.33 |
| 400 | 1.34 |

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

That which is claimed is:

1. An electrochemical power generation system comprising:
    an anode;
    a cathode;
    an electrical conductor connecting the anode and the cathode; and
    a housing for containing an aqueous electrolyte medium in contact with at least a portion of the anode and the cathode, wherein the aqueous electrolyte medium comprises oxidizable non-carbon constituents of a fossil fuel, and wherein the system is configured to obtain energy from the oxidizable non-carbon constituents of the fossil fuel at a temperature below the oxidation temperature of carbon.

2. The system of claim 1, further comprising the aqueous electrolyte medium in the housing.

3. The system of claim 2, wherein the pH of the aqueous electrolyte medium is 6 or less.

4. The system of claim 2, wherein the aqueous electrolyte medium comprises acid mine drainage.

5. The system of claim 1, further comprising an aqueous electrolyte medium processor, wherein the aqueous electrolyte medium processor is configured to produce the aqueous electrolyte medium with a standardized energy density.

6. The system of claim 5, wherein the standardized energy density ranges from 6,000 btu per gallon to 135,000 btu per gallon.

7. The system of claim 1, wherein the non-carbon constituents of the fossil fuel comprise pyrite.

8. The system of claim 7, wherein the pyrite comprises framboidal pyrite.

9. The system of claim 1, wherein the non-carbon constituents of the fossil fuel comprise greigite.

10. The system of claim 1, wherein the fossil fuel comprises coal.

11. The system of claim 1, further comprising a reactor configured to regenerate the non-carbon constituents of the fossil fuel, wherein the reactor contains a regeneration medium contacted with a source of energy.

12. The system of claim 11, wherein the reactor is configured to regenerate the non-carbon constituents of the fossil fuel chemically.

13. The system of claim 11, wherein the regeneration medium comprises at least one species of microorganism for regenerating the non-carbon constituents of the fossil fuel.

14. The system of claim 1, wherein the energy is electrical energy.

15. The system of claim 1, wherein the system is configured to produce hydrogen.

16. The system of claim 1, wherein the temperature is ambient temperature.

17. The system of claim 1, wherein the system is a continuous flow system.

18. A method for obtaining energy from non-carbon constituents of a fossil fuel, the method comprising:

contacting the fossil fuel with an aqueous medium to produce an aqueous electrolyte medium comprising oxidizable non-carbon constituents of the fossil fuel;

oxidizing the aqueous electrolyte medium in an electrochemical power generation system according to claim 1 at a temperature below the oxidation temperature of carbon to obtain energy.

19. The method of claim 18, wherein the aqueous medium comprises acid mine drainage.

20. The method of claim 18, further comprising regenerating the non-carbon constituents of the fossil fuel.

21. The method of claim 18, further comprising processing the aqueous electrolyte medium before oxidizing to produce an aqueous electrolyte medium with a standardized energy density.

22. A system for generating power, the system comprising one or more electrochemical power generation systems comprising:

an anode;

a cathode;

an electrical conductor connecting the anode and the cathode; and a housing for containing an aqueous electrolyte medium in contact with at least a portion of the anode and the cathode, wherein the aqueous electrolyte medium comprises oxidizable non-carbon constituents of a fossil fuel, and wherein the one or more electrochemical power generation systems are configured to obtain energy from the oxidizable non-carbon constituents of the fossil fuel at a temperature below the oxidation temperature of carbon.

23. The system of claim 22, further comprising the aqueous electrolyte medium in the housing, wherein the aqueous electrolyte medium comprises acid mine drainage.

24. The system of claim 22, further comprising one or more aqueous electrolyte medium processors, wherein the aqueous electrolyte medium processors are configured to produce the aqueous electrolyte medium with a standardized energy density.

25. The system of claim 22, further comprising one or more reactors configured to regenerate the non-carbon constituents of the fossil fuel, wherein the reactors contain a regeneration medium contacted with a source of energy.

* * * * *